US009395883B1

(12) United States Patent
Olsson et al.

(10) Patent No.: US 9,395,883 B1
(45) Date of Patent: Jul. 19, 2016

(54) SYSTEMS AND METHOD FOR INTEGRATION OF BUSINESS ANALYTICS AND BUSINESS NETWORKING

(71) Applicant: Anametrix, Inc., San Diego, CA (US)

(72) Inventors: Anders Olsson, San Diego, CA (US);
Roman Jugai, San Diego, CA (US);
Andreas Jonsson, San Diego, CA (US);
Sergey Mikhaylov, La Mesa, CA (US);
Corey Francis, San Diego, CA (US)

(73) Assignee: Anametrix, Inc., San Diego, CA (US)

( * ) Notice: Subject to any disclaimer, the term of this patent is extended or adjusted under 35 U.S.C. 154(b) by 305 days.

(21) Appl. No.: 13/844,040

(22) Filed: Mar. 15, 2013

Related U.S. Application Data

(63) Continuation of application No. 13/598,438, filed on Aug. 29, 2012.

(60) Provisional application No. 61/528,618, filed on Aug. 29, 2011.

(51) Int. Cl.
*G06F 3/0482* (2013.01)
*G06F 9/54* (2006.01)
*G06F 17/30* (2006.01)

(52) U.S. Cl.
CPC .............. *G06F 3/0482* (2013.01); *G06F 9/542* (2013.01); *G06F 17/30864* (2013.01)

(58) Field of Classification Search
CPC ........................... G06F 17/30864; G06F 9/542
See application file for complete search history.

(56) References Cited

U.S. PATENT DOCUMENTS

| | | | |
|---|---|---|---|
| 6,446,123 B1 * | 9/2002 | Ballantine | H04L 12/2602 709/223 |
| 6,901,428 B1 | 5/2005 | Frazier et al. | |
| 9,083,562 B2 * | 7/2015 | Bates | H04L 12/6418 |
| 2003/0050969 A1 | 3/2003 | Sant et al. | |
| 2003/0163479 A1 | 8/2003 | Mathews et al. | |
| 2003/0182359 A1 | 9/2003 | Vorchik et al. | |
| 2003/0226029 A1 | 12/2003 | Porter et al. | |
| 2004/0019788 A1 | 1/2004 | Miyazaki et al. | |
| 2005/0188016 A1 | 8/2005 | Vdaygiri et al. | |

(Continued)

OTHER PUBLICATIONS

Office Action in U.S. Appl. No. 13/396,362 dated Nov. 7, 2013 (8 pages).

(Continued)

*Primary Examiner* — Sherrod Keaton
(74) *Attorney, Agent, or Firm* — Banner & Witcoff, Ltd.

(57) ABSTRACT

Systems and methods to provide social analytics information are disclosed. An exemplary system may include a database and a server coupled to the database. The server may include a business analytics module configured to receive data related to a business and generate, based on the received data, a set of business analytics information, and store the business analytics information in the database. The server further may include an interactive display module configured to generate an interactive object based on the business analytics information, provide controlled access to the interactive object to a first user of a predefined group of users, and provide a display of the interactive object to a second user of the predefined group of users. The interactive display module may be further configured to update, responsive to an input from the first user, the interactive object so as to generate an updated interactive object, and provide, responsive to the updating, a display of the updated interactive object to the second user.

24 Claims, 16 Drawing Sheets

Example Alert Generation Menu

(56) References Cited

U.S. PATENT DOCUMENTS

| | | |
|---|---|---|
| 2006/0212376 A1 | 9/2006 | Snyder et al. |
| 2007/0047701 A1* | 3/2007 | Morris .................. G06Q 10/10 379/100.08 |
| 2007/0112607 A1* | 5/2007 | Tien ....................... G06Q 10/00 705/7.39 |
| 2007/0118570 A1 | 5/2007 | Wang |
| 2007/0185830 A1 | 8/2007 | Rubel |
| 2007/0216535 A1* | 9/2007 | Carrino .................... 340/573.1 |
| 2007/0277090 A1 | 11/2007 | Raja et al. |
| 2008/0262908 A1 | 10/2008 | Broady et al. |
| 2008/0263029 A1 | 10/2008 | Guha et al. |
| 2008/0295074 A1 | 11/2008 | Schneider et al. |
| 2008/0307189 A1 | 12/2008 | Mityagin et al. |
| 2009/0077014 A1 | 3/2009 | Zachariah |
| 2009/0132920 A1 | 5/2009 | Deyo et al. |
| 2009/0292681 A1 | 11/2009 | Wood et al. |
| 2010/0077048 A1 | 3/2010 | Czyzewicz et al. |
| 2010/0191702 A1 | 7/2010 | Hofmann |
| 2010/0274804 A1 | 10/2010 | Muskal et al. |
| 2011/0004622 A1 | 1/2011 | Marson |
| 2011/0060738 A1 | 3/2011 | Gates et al. |
| 2011/0107195 A1 | 5/2011 | Raja et al. |
| 2011/0119226 A1 | 5/2011 | Ruhl et al. |
| 2011/0246741 A1 | 10/2011 | Raymond et al. |
| 2012/0059795 A1* | 3/2012 | Hersh et al. .................. 707/628 |
| 2012/0198369 A1 | 8/2012 | Sorin et al. |
| 2012/0239619 A9 | 9/2012 | Hersh et al. |
| 2012/0311462 A1 | 12/2012 | Devecka |
| 2013/0124461 A1 | 5/2013 | Dombrowski et al. |

OTHER PUBLICATIONS

Office Action in U.S. Appl. No. 13/453,926 dated Feb. 12, 2014 (19 pages).

Office Action in U.S. Appl. No. 13/396,362 dated May 22, 2014 (8 pages).

Office Action in U.S. Appl. No. 13/598,438 dated Jul. 3, 2014 (12 pages).

East African Community Secretariat, Enhancing Capacities of the Meteorological Services in Support of Sustainable Development in the East African Community Region Focusing on Data Processing and Forecasting Systems, EAC Report, 2008, pp. 1-286.

Johnson et al., Seasonality in an Empirically Derived Markov Model of Tropical Pacific Sea Surface Temperature Anomalies, American Meteorological Society, 2000, pp. 3327-3335.

The CEPIN Project, Text Alerts & 9-1-1: A Fact Sheet for People who are Deaf or Hard of Hearing, 2009, pp. 1-2.

* cited by examiner

*Example User Interface to a Social Analytics (SA) System*

*Example Search Results*

*Example Search Bar*

Example Search Term Processing

*Example Report*

*Example Menu Bar and Share Button*

*Example Share Options Window*

*Example Menu Bar and Share Button*

*Example Share Selection Window*

*Example Alert Generation Menu*

*Example Alert Post to Flow*

*Example Report Scheduling Interface*

*Example Scheduled Report Post to Flow*

*Example Interactive Report and Visualization*

*Example Visualization and Filtered Comments*

*Example Live Reporting Window*

Example User Interaction with System

*Example Process for Interactive Editing of a Report On a Social Analytics System*

Example Process for Interactive Editing of an Object with Real Time Sharing On a Social Analytics Network

*Example Process for Interactive Editing of an Object with Real Time Sharing On a Social Analytics System*

Example Process for Interactive Editing of an Object with Real Time Sharing On a Social Analytics System

SYSTEMS AND METHOD FOR INTEGRATION OF BUSINESS ANALYTICS AND BUSINESS NETWORKING

PRIORITY

This application is a continuation of U.S. patent application Ser. No. 13/598,438, filed Aug. 29, 2012, which claims priority under 35 U.S.C. 119(e) to U.S. Provisional Patent Application No. 61/528,618, entitled "SYSTEMS AND METHOD FOR INTEGRATION OF BUSINESS ANALYTICS AND BUSINESS NETWORKING," filed Aug. 29, 2011, the contents of both of which are incorporated by reference.

FIELD

This disclosure relates generally to systems and methods for integrating business analytics and analysis, processing, and presentation of associated information within business or social networks.

BACKGROUND

With the growth of the Internet and World Wide Web ("Web") along with high performance centralized data collection and processing systems, the ability to provide distributed data and information, as well as collect, process, and analyze such data, has grown dramatically. Technologies such as Business Analytics (BA) and Web Analytics (WA) allow businesses to collect data and information from web and other sources (e.g., broadcast, print media, etc.) and analyze and present associated information to business users.

Social Media (SM) facilitates functions such as social networking, content sharing, blogs, wikis, and other information sharing. Websites such as Facebook, Twitter, LinkedIn, YouTube, Flickr, and the like have made social media ubiquitous.

SUMMARY

Exemplary aspects of the invention that are shown in the drawings are summarized below. These and other aspects are more fully described in the Detailed Description section. It is to be understood, however, that there is no intention to limit the invention to the forms described in this Summary or in the Detailed Description. One skilled in the art can recognize that there are numerous modifications, equivalents and alternative constructions that fall within the spirit and scope of the invention as expressed in the claims.

In one aspect, the present disclosure relates to a method of providing social analytics information. The method includes generating, responsive to a first input from a first user of a predefined group of users, an interactive object, and providing the interactive object to a second user of the predefined group of users. The method further includes receiving comments from the second user, and providing the comments to the first user.

In another aspect, the present disclosure relates to an alternative method for providing social analytics information. The alternative method includes generating an interactive object based on a set of business analytics data, and providing controlled access to the interactive object to a first user of a predefined group of users. The alternative method further includes providing a display of the interactive object to a second user of the predefined group of users, updating, responsive to an input from the first user, the interactive object so as to generate an updated interactive object, and providing, responsive to the updating, a display of the updated interactive object to the second user.

In yet another aspect, the present disclosure relates to a system for providing social analytics information. The system includes a database and a server coupled to the database. The server includes a business analytics module configured to receive data related to a business, and generate, based on the received data, a set of business analytics information, and store the business analytics information in the database. The server further includes an interactive display module configured to generate an interactive object based on the business analytics information, provide controlled access to the interactive object to a first user of a predefined group of users, and provide a display of the interactive object to a second user of the predefined group of users. The interactive display module is further configured to update, responsive to an input from the first user, the interactive object so as to generate an updated interactive object, and provide, responsive to the updating, a display of the updated interactive object to the second user.

In yet another aspect, the present disclosure relates to a computer program product comprising a computer-readable medium including codes executable by a processor to generate an interactive object based on a set of business analytics data, provide controlled access to the interactive object to a first user of a predefined group of users, and provide a display of the interactive object to a second user of the predefined group of users. The computer-readable medium further includes codes executable by the processor to update, responsive to an input from the first user, the interactive object so as to generate an updated interactive object, and provide, responsive to the updating, a display of the updated interactive object to the second user.

In yet another aspect, the present disclosure relates to an alternative method for providing social analytics information. The alternative method includes receiving, from a server system, information defining a user interface configured to allow editing of one of a plurality of interactive objects by a first user of a group of predefined users, displaying the received user interface, including displaying information associated with a plurality of interactive objects available for editing, and receiving, from a first user of the group of predefined users, a selection of a first interactive object of the plurality of interactive objects. The alternative method further includes sending information associated with the selection of a first interactive object to the server system, displaying, on the user interface, the first interactive object for editing by the first user; receiving an editing input from the first user to edit the first interactive object, providing the editing input to the server system for use in generating an updated first interactive object based on the editing input, and receiving, from a second user of the group of predefined users, information associated with the updated first interactive object.

In yet another aspect, the present disclosure relates to an alternative system for providing social analytics information. The alternative system includes a display, a memory, and a processor coupled to the memory. The processor is configured to receive, from a server system, information defining a user interface configured to allow editing of one of a plurality of interactive objects, render the received user interface on the display, including displaying information associated with a plurality of interactive objects available for editing, receive, from a first user, a selection of a first interactive object of the plurality of interactive objects and send information associated with the selection of a first interactive object to the server system. The processor is further configured to display the first interactive object for editing by the first user on the display, receive an editing input from the first user to edit the first interactive object, provide the editing input to the server system for use in generating an updated first interactive object based on the editing input, and receive, from a second user of the plurality of users, information associated with the updated first interactive object.

In yet another aspect, the present disclosure relates to an alternative computer program product comprising a computer-readable medium including codes executable by a processor. The codes cause the processor to receive, from a server system, information defining a user interface configured to allow editing of one of a plurality of interactive objects by a first user of a group of predefined users, display the received user interface, including displaying information associated with a plurality of interactive objects available for editing, receive, from a first user of the group of predefined users, a selection of a first interactive object of the plurality of interactive objects, send information associated with the selection of a first interactive object to the server system, display, on the user interface, the first interactive object for editing by the first user, receive an editing input from the first user to edit the first interactive object, provide the editing input to the server system for use in generating an updated first interactive object based on the editing input, and receive, from a second user of the group of predefined users, information associated with the updated first interactive object.

In yet another aspect, the present disclosure relates to yet another alternative system for providing social analytics information. This alternative system includes display means, memory means, and means for receiving, from a server system, information defining a user interface configured to allow editing of one of a plurality of interactive objects. The alternative system further includes means for rendering the received user interface on the display, including displaying information associated with a plurality of interactive objects available for editing, means for receiving, from a first user, a selection of a first interactive object of the plurality of interactive objects, means for sending information associated with the selection of a first interactive object to the server system, means for displaying the first interactive object for editing by the first user on the display and means for receiving an editing input from the first user to edit the first interactive object. The alternative system further includes means for providing the editing input to the server system for use in generating an updated first interactive object based on the editing input, and means for receiving, from a second user of the plurality of users, information associated with the updated first interactive object.

In yet another aspect, the present disclosure relates to yet another alternative method for providing social analytics information. This alternative method includes receiving, from a server system, information defining a user interface configured to allow display of a plurality of interactive objects, displaying the received user interface, including displaying information associated with an interactive object being edited by a first user of a predefined group of users, receiving information defining an update to the interactive object based on the editing of the interactive object by the first user, and displaying an update of the interactive object.

In yet another aspect, the present disclosure relates to another alternative system for providing social analytics information. This alternative system includes a display, a memory, and a processor coupled to the memory. The processor is configured to receive, from a server system, information defining a user interface configured to allow display of a plurality of interactive objects, render the received user interface on the display, including displaying information associated with an interactive object being edited by a first user of a predefined group of users, receive information defining an update to the interactive object based on the editing of the interactive object by the first user, and display an update of the interactive object on the display.

In yet another aspect, the present disclosure relates to another computer program product comprising a computer-readable medium including codes executable by a processor. The codes cause the processor to receive, from a server system, information defining a user interface configured to allow display of a plurality of interactive objects, display the received user interface, including displaying information associated with an interactive object being edited by a first user of a predefined group of users; receive information defining an update to the interactive object based on the editing of the interactive object by the first user, and display an update of the interactive object.

In yet another aspect, the present disclosure relates to an alternative system for providing social analytics information. The system of this aspect includes display means, memory means, means for receiving, from a server system, information defining a user interface configured to allow display of a plurality of interactive objects, and means for rendering the received user interface on the display, including displaying information associated with an interactive object being edited by a first user of a predefined group of users. The system of this aspect further includes means for receiving information defining an update to the interactive object based on the editing of the interactive object by the first user, and means for displaying an update of the interactive object on the display.

In yet another aspect, the present disclosure relates to yet another alternative method for providing social analytics information. The alternative method of this aspect includes providing, to a first user of a social analytics system, a user interface including a menu option to subscribe to one or more alerts that may be provided to a plurality of users of the social analytics system, receiving, from the first user, a request to subscribe to the alert, and providing, responsive to conditions for triggering the alert, alert information to a flow associated with the first user.

In yet another aspect, the present disclosure relates to another alternative system for providing social analytics information. The system of this aspect includes a memory and a processor coupled to the memory. The processor is configured to provide, to a first user of a social analytics system, a user interface including a menu option to subscribe to one or more alerts that may be provided to a plurality of users of the social analytics system, receive, from the first user, a request to subscribe to the alert, and provide, responsive to conditions for triggering the alert, alert information to a flow associated with the first user.

In yet another aspect, the present disclosure relates to another computer program product comprising a computer-readable medium including codes executable by a processor. The codes cause the processor to provide, to a first user of a social analytics system, a user interface including a menu option to subscribe to one or more alerts that may be provided to a plurality of users of the social analytics system, receive, from the first user, a request to subscribe to the alert, and provide, responsive to conditions for triggering the alert, alert information to a flow associated with the first user.

In yet another aspect, the present disclosure relates to another alternative system for providing social analytics information. The system of this aspect includes memory means, means for providing, to a first user of a social analytics system, a user interface including a menu option to subscribe to one or more alerts that may be provided to a plurality of users of the social analytics system, means for receiving, from the first user, a request to subscribe to the alert, and means for providing, responsive to conditions for triggering the alert, alert information to a flow associated with the first user.

In yet another aspect, the present disclosure relates to an alternative system for providing social analytics information. The alternative system includes database means for storing business analytics information, means for receiving data related to a business, and generating, based on the received data, a set of business analytics information, and means for storing the business analytics information in the database. The alternative system further includes means for generating an interactive object based on the business analytics information, means for providing controlled access to the interactive object to a first user of a predefined group of users, and means for providing a display of the interactive object to a second user of the predefined group of users. The alternative system further includes means for updating, responsive to an input from the first user, the interactive object so as to generate an updated interactive object, and means for providing, responsive to the updating, a display of the updated interactive object to the second user.

In yet another aspect, the present disclosure relates to yet another method for providing social analytics information. The method of this aspect includes providing, to a first user of a social analytics system, a user interface including a search bar for receiving natural language queries, receiving, from the first user, a natural language query related to business analytics information, processing the natural language query in an natural language processing (NLP) module, and providing a query result to the first user.

In yet another aspect, the present disclosure relates to another system for providing social analytics information. The system of this aspect includes a memory and a processor coupled to the memory. The processor is configured to provide, to a first user of a social analytics system, a user interface including a search bar for receiving natural language queries, receive, from the first user, a natural language query related to business analytics information, process the natural language query in an natural language processing (NLP) module, and provide a query result to the first user.

In yet another aspect, the present disclosure relates to another computer program product comprising a computer-readable medium including codes executable by a processor. The codes cause the processor to provide, to a first user of a social analytics system, a user interface including a search bar for receiving natural language queries, receive, from the first user, a natural language query related to business analytics information, process the natural language query in an natural language processing (NLP) module, and provide a query result to the first user.

In yet another aspect, the present disclosure relates to another system for providing social analytics information. The system of this aspect includes memory means, means for providing, to a first user of a social analytics system, a user interface including a search bar for receiving natural language queries, means for receiving, from the first user, a natural language query related to business analytics information, means for processing the natural language query in an natural language processing (NLP) module, and means for providing a query result to the first user.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure may be more fully appreciated in connection with the following detailed description taken in conjunction with the accompanying drawings, wherein.

DETAILED DESCRIPTION

Overview

Figure 1:
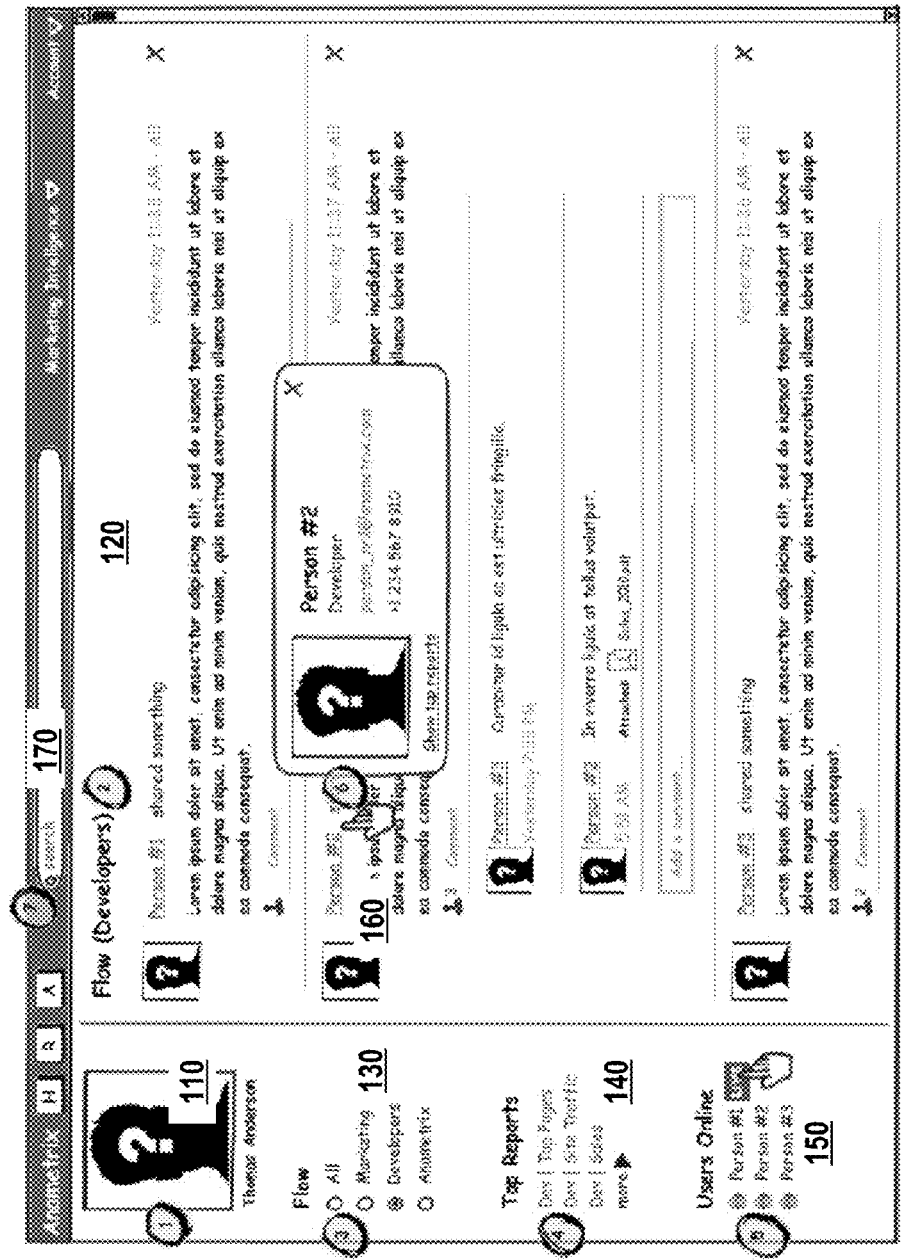
FIG. 1 illustrates details of an embodiment of a Social Analytics user interface.

Business Analytics is a rapidly growing technology field related to providing businesses with business users with data and information regarding this business. Business analytics tools can be used by businesses to allow them to better understand the mechanics and details of their business, at both the micro and macro-levels.

Typical business analytics tools and applications include performing rigorous statistical and quantitative analyses of business data, which is typically done in a continuous, iterative fashion. Results can be used by businesses to provide insights into a company's performance that may otherwise be unapparent. For example, business analytics solutions can identify trends, provide alerts, and make predictions. Some applications of business analytics and associated business analytics systems and processing are described in, for example, U.S. Provisional Patent Application Ser. No. 61/442,467, filed Feb. 14, 2011, entitled METHODS AND APPARATUS FOR INTERACTIVE DATA MANAGEMENT USING AN APPLICATION PLUG-IN, in U.S. Utility patent application Ser. No. 13/396,362, filed Feb. 14, 2012, entitled METHODS AND APPARATUS FOR INTERACTIVE DATA MANAGEMENT USING AN APPLICATION PLUG-IN, in U.S. Provisional Patent Application Ser.

No. 61/477,993, filed Apr. 21, 2011, entitled METHODS AND SYSTEMS FOR PREDICTIVE ALERTING, and in U.S. Utility patent application Ser. No. 13/453,926, filed Apr. 23, 2012, entitled METHODS AND SYSTEMS FOR PREDICTIVE ALERTING (denoted collectively herein as the "Related Applications"). The content of each of these Related Applications is incorporated by reference herein in its entirety.

A field closely related to Business Analytics is Web Analytics (WA), which provides statistical analysis of a company's web traffic and related information.

This disclosure relates generally to systems and methods for integrating business analytics and analysis, processing, and presentation of associated information within business or social networks. Such integrated systems and associated applications may be denoted as "Social Analytics" (SA) systems to describe seamlessly blended Social or Business Media with Business Analytics.

These integrated systems may provide various advantages over existing technology. For example, existing BA solutions are highly data centric and provide little to no ability for interaction among users. Users of current systems are typically provided only with data or information, and have no ability to interact with the data or information, define groups of other users with which to share the information, or update or change the data or information. As such, users rely on email, SMS message, or even phone calls to have conversations with other users to share or discuss business information.

In yet another aspect, the present disclosure relates to another method for providing social analytics information. The method of this aspect includes providing, to a first user of a social analytics system, a user interface including a menu option to subscribe to a report to be provided to a plurality of users of the social analytics system, receiving, from the first user, a request to subscribe to the report, and providing, responsive to generation or update of the report, a presentation of the report in a flow associated with the first user.

In yet another aspect, the present disclosure relates to another system for providing social analytics information. The system of this aspect includes a memory and a processor coupled to the memory. The processor is configured to provide, to a first user of a social analytics system, a user interface including a menu option to subscribe to a report to be provided to a plurality of users of the social analytics system, receive, from the first user, a request to subscribe to the report, and provide, responsive to generation or update of the report, a presentation of the report in a flow associated with the first user.

In yet another aspect, the present disclosure relates to another computer program product comprising a computer-readable medium including codes executable by a processor. The codes cause the processor to provide, to a first user of a social analytics system, a user interface including a menu option to subscribe to a report to be provided to a plurality of users of the social analytics system, receive, from the first user, a request to subscribe to the report, and provide, responsive to generation or update of the report, a presentation of the report in a flow associated with the first user.

In yet another aspect, the present disclosure relates to another system for providing social analytics information. The system of this aspect includes memory means, means for providing, to a first user of a social analytics system, a user interface including a menu option to subscribe to a report to be provided to a plurality of users of the social analytics system, means for receiving, from the first user, a request to subscribe to the report, and means for providing, responsive to generation or update of the report, a presentation of the report in a flow associated with the first user.

For example, embodiments of the present invention allow users to interact with each other in a social-networking like interface with combined business analytics functionality. Various functions may be included in displays or other interfaces that may be provided on a webpage, allowing a user to access the interface and information through a standard web browser, and/or through a standalone application, that may provide web-like functionality with additional advantages and/or controls available through a standalone application.

Functions that may be included in various business analytics systems embodiments may include, for example, one or more search bars, configured to allow users to search through shared content in a flow (as described subsequently below), as well as providing the ability to search for alerts, reports, recipes, contacts, and/or other data or information. In some embodiments, a search bar may be coupled with other functionality, such as, for example, Natural Language Processing (NLP), where a search term or phrase may be processed to generate visualization or other information.

In another aspect, social analytics system embodiments may be configured to facilitate content sharing, whereby reports, visualizations, alerts, scheduled information (such as scheduled reports), and/or other data or information may be shared, in a controlled or monitored fashion, among appropriate users. In addition, in another aspect, users may be provided with a mechanism to comment and/or update shared information. For example, users may be allowed to attach files (e.g., PDF, XLS, PNG, etc.), answer with responsive visualizations, and/or otherwise be provided with a mechanism to provide comment and feedback.

In another aspect, social analytics system embodiments may be configured to provide interactive reports, including the ability for users to comment on visualizations, reports, and/or other data or information. Some embodiments may allow users to generate and/or amend or update information objects (denoted herein for brevity as "objects"), such as reports, data tables, graphs or other displays of information, summaries, or other business or web analytics data or information, and then share the information with others using the business analytics interface.

For example, a user may be provided with an interface to create and publish a report to other users (who are provided group or object or category access). The other users may then be able to instantly see the report and comment on it. In addition, information associated with object creation, updates, comments, and/or other information may be provided to other users in the form of a feed, alert, page, or other indication.

In addition, users or businesses may be provided with an interface to allow creation and editing of users' groups, as well as control how information may be generated, shared, amended, and distributed, as well as how objects may be edited, displayed, distributed, etc.

In addition, users may be provided with an interface to dynamically interact with objects in a social analytics system. For example, a SA user may be allowed to interactively control an object such as a data display graph or other information, with the updated information then shared immediately with other users. Real-time interaction between the users may be provided, allowing applications such as real-time user interaction with commenting, feedback, etc., regarding the object or other information being shared.

Various additional aspects, details, features, and functions are described below in conjunction with the appended Drawing figures.

The following exemplary embodiments are provided for the purpose of illustrating examples of various aspects, details, and functions of apparatus and systems; however, the described embodiments are not intended to be in any way limiting. It will be apparent to one of ordinary skill in the art that various aspects may be implemented in other embodiments within the spirit and scope of the present disclosure.

It is noted that as used herein, the term, "exemplary" means "serving as an example, instance, or illustration." Any aspect, detail, function, implementation, and/or embodiment described herein as "exemplary" is not necessarily to be construed as preferred or advantageous over other aspects and/or embodiments.

FIG. 1 illustrates details of one embodiment of a user interface for a social analytics application in accordance with aspects of the present invention. In a typical system, each business user will have a "Profile" 110, which includes information about the user, such as a name or userid, photo or avatar, contact information (email, phone, address, etc.), and/or other user information.

Users may be provided an interface to interact with the system in the form of a flow 120. The flow 120 allows users to share objects and other information with other users, such as reports, alerts, etc. In addition, the flow 120 may be used as a mechanism to allow users to interact with posts provided by other users and/or to leave comments and post responses with new visualizations (e.g., graphs or other graphical presentations of information), and/or attach files, such as JPEGs, PDFs, etc.

Users may be allowed to control their flow 120. For example, a user that is a member of multiple groups may be provided with an interface 130 to set filters or other controls to filter out unneeded or irrelevant information or groups (e.g., Marketing, Developers, System, etc.). A flow with information about particular product features may also be provided. For example, a flow may be filtered by product features, such as, for example, alerts, scheduled, reports, etc., so that a user is presented with posts to their flow only from those specific features.

An interface 140 to allow users to readily access frequently used or most common used reports or other information may be provided. For example, reports or other objects may be listed by category of use or relevance. Additional information may be further accessed through a "more" function, allowing access to less important or less frequently used objects or other reports provided to or shared by the group or community (e.g., where a group is a subset of a community).

An available users interface 150 may be provided to allow users to see which other associated users are online and/or available, such as for interactive communications. For example, the users may be provided with a button or other mechanism to initiate an interactive communication, video-conference (if webcams are available) and/or other interaction, such as a voice conference over the system.

In addition, a "Live" button, such as shown, may be displayed in the interface, thereby allowing a user to view, in real time, a report or other object that an associated user is working on. For example, in interface 150 as shown in FIG. 1, a user may be provided with a "Live" button icon associated with another user (in this case Person #1), and selection of the icon may then allow the user to view the report that "Person #1" is working on, and/or may be allowed to comment on or otherwise interact with Person #1 while the report is being worked on (e.g., created, edited, updated, etc.). Additional details regarding aspects of this functionality are further described subsequently herein. A user may also be provided with a webcam (e.g., audio and video), or audio interface to communicate with other users A user profile or other user identification panel 160 may be included to provide more information about others that a user is communicating with. For example, a photo, avatar, or other user specific information, such as user's business card and/or text information, such as email addresses, mail addresses, phone numbers, and/or other information may be included in panel 160.

A search bar 170 may be included to allow users to search and identify content available to users, such as, for example, alerts, scheduled reports, contacts, groups, saved reports, information provided by other users into the flow, etc. Results may be returned based on specific keyword searches and/or other processing, such as NLP processing on received phrases or other groups of terms. For example, as a user types in text into the search bar, the entered string of characters may be processed and a list of results may be displayed, such as, for example, by category and/or including a sub-selection of options or top hits with the category.

Figure 2:
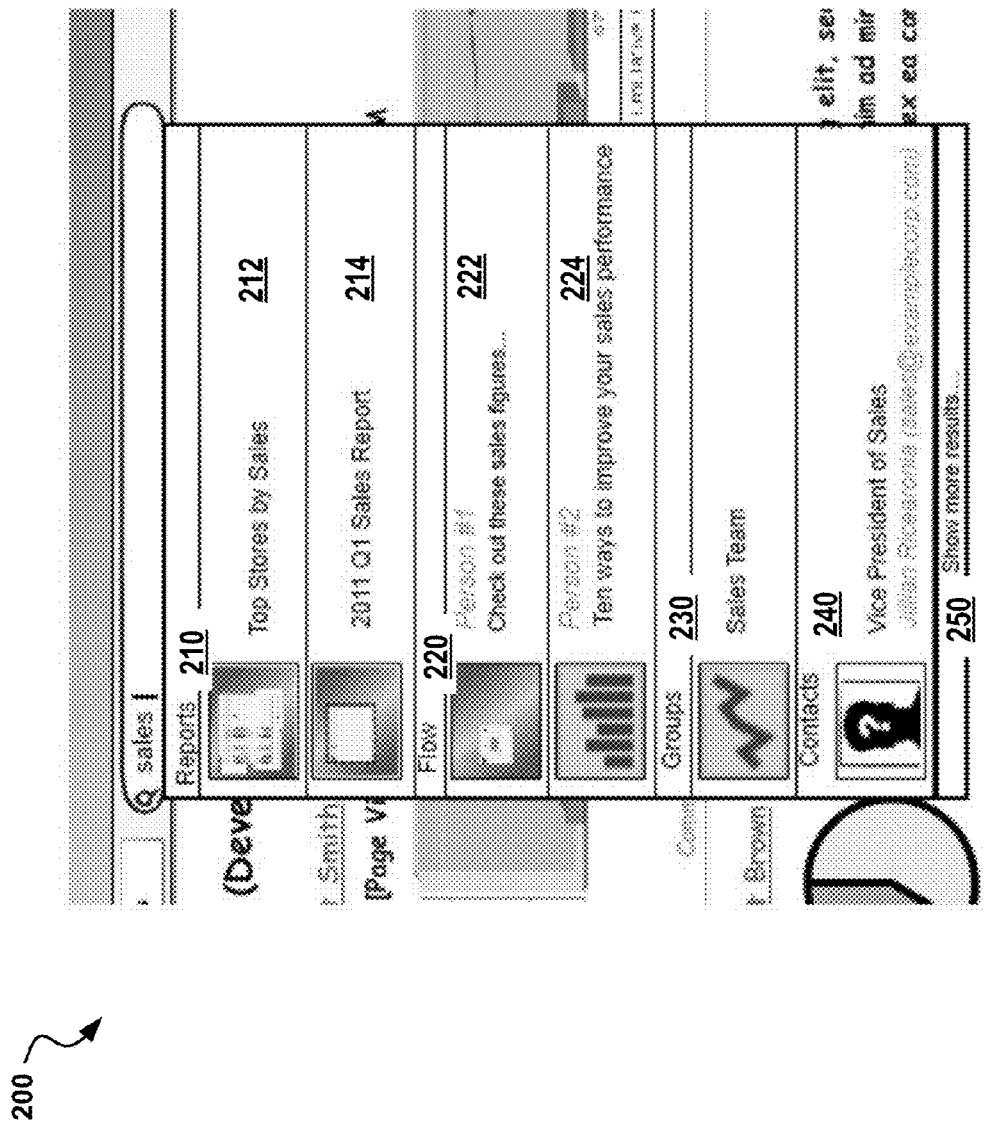
FIG. 2 illustrates example search results from a Social Analytics system using an interface such as shown in FIG. 1.

FIG. 2 illustrates additional details of an embodiment of a search bar interface 200, which may correspond with interface 170 of FIG. 1, including additional search-related results for an example search. For example, if a user performs a search starting with the term "sales" as shown, a listing of available information may be provided to the user, such as, for example, in the form of a category heading and available content or information. For example, one category of potential importance may be reports 210, and a list of possible reports 212 and 214 of the highest or most likely interest to the particular user may be provided as shown. Although the example of FIG. 2 illustrates two sub-hits, it is apparent that various other numbers of potential sub-hits may be shown in different embodiments.

Other information of interest may include flows 220, with information identifying other users (e.g., Person #1 and Person #2 in this case) and associated information 222, 224, from their flows respectively, as well as Groups 230, which may provide information regarding groups to which the user belongs, and Contacts 240, which may provide information regarding relevant contacts, such as other users with information and/or responsibility over business functions related to the search term(s). Other functions may also be provided, such as, for example, a selection option to allow a user to see more search results (function 250), change or amend search terms (not shown in FIG. 2), and/or perform other search-related functions (not shown).

Figure 3:
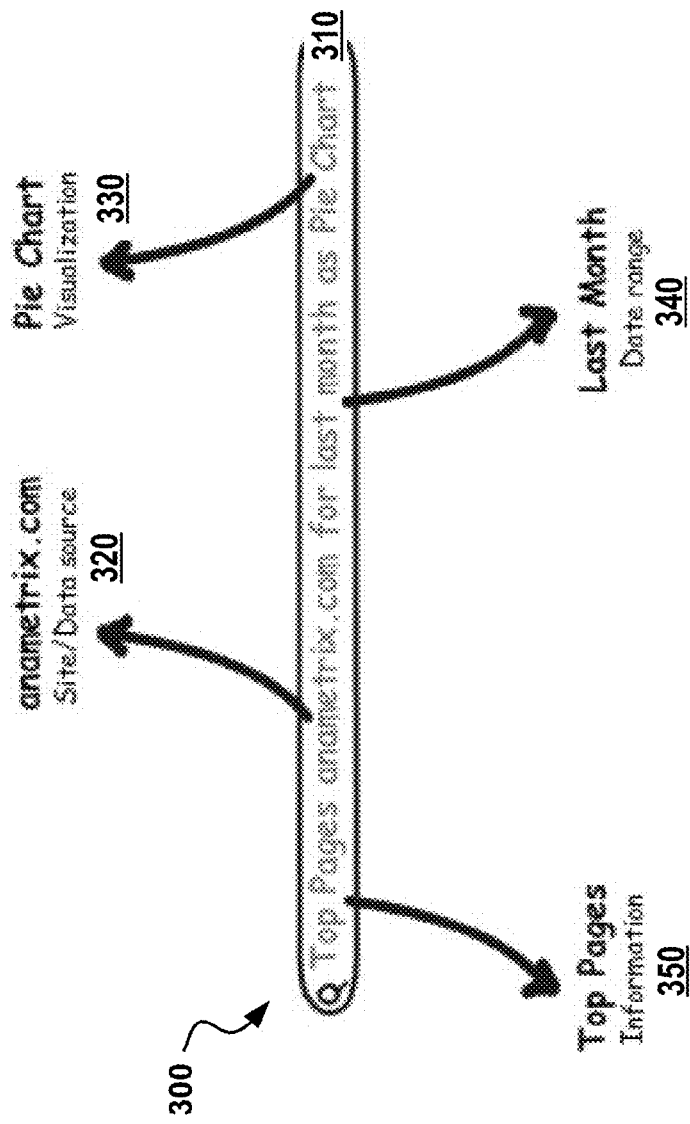
FIG. 3 illustrates details of a search bar embodiment for use in an interface such as shown in FIG. 1.

FIG. 3 illustrates additional details of an embodiment of a search bar 300, which may correspond with search bar 170 as shown in FIG. 1. In a typical configuration, all functions or at least the most frequently accessed or most important should be easy to access. In order to provide this feature, natural language (NLP) search functionality may be used to make it easier for a user to go from a thought to a report.

In the example of FIG. 3, the first search string text entered (e.g., "Top Pages anametrix.com for last month as Pie Chart") may be received by a business analytics system and parsed to generate relevant search terms, such as, for example, information 350, such as top pages, most requested information, etc., a site or data source site 320 (in the case, a company name, website, etc., such as "anametrix.com"), a visualization 330 (e.g., a graph, chart or other visualization graphic), as well as a date range 340 (e.g., last week or range of weeks, month, year, etc.).

In an exemplary embodiment, information 350 is the type of information desired, such as, for example, "Top Pages" as shown, or other information, such as "Number of Impressions," (e.g., number of hits on a website) which may be a metric brought into the system from a connector. The site/data source 320 is a location where information may be found within the business analytics system, as well as additional related information such as filters to be applied to correctly present the information. A second example search string is "Number of Impressions (Information) for Campaign 2536874 (Site/Data Source) during this year (Date Range)" which may be similarly parsed.

A date range 340, which may be optionally included, may be a static date range, such as 2011-05-01 to 2011-05-31 and/or a varying or relative date range, such as, for example, last week or last month (as shown in the second example search string above). If no date range is entered, a default date range or other date-range selection mechanism (such as, for example, a date range selected based on the type of information requested) may be used. A visualization 330 may also optionally be included (for example, the visualization is omitted for the second search string example described above). For example, a type of graph or chart or other data presentation format may be specifically provided, or, if not, a default type may be applied as with the date range 340.

In order to be able to know whether a search term, such as, for example, "Subscribers," is linked to a certain connector (e.g., in this example an email marketing provider), it may be desirable to tag connectors and data sources. When new sources of data are provided to the business analytics system, they may be tagged accordingly so that a user may readily access the data through the search bar.

Figure 4:
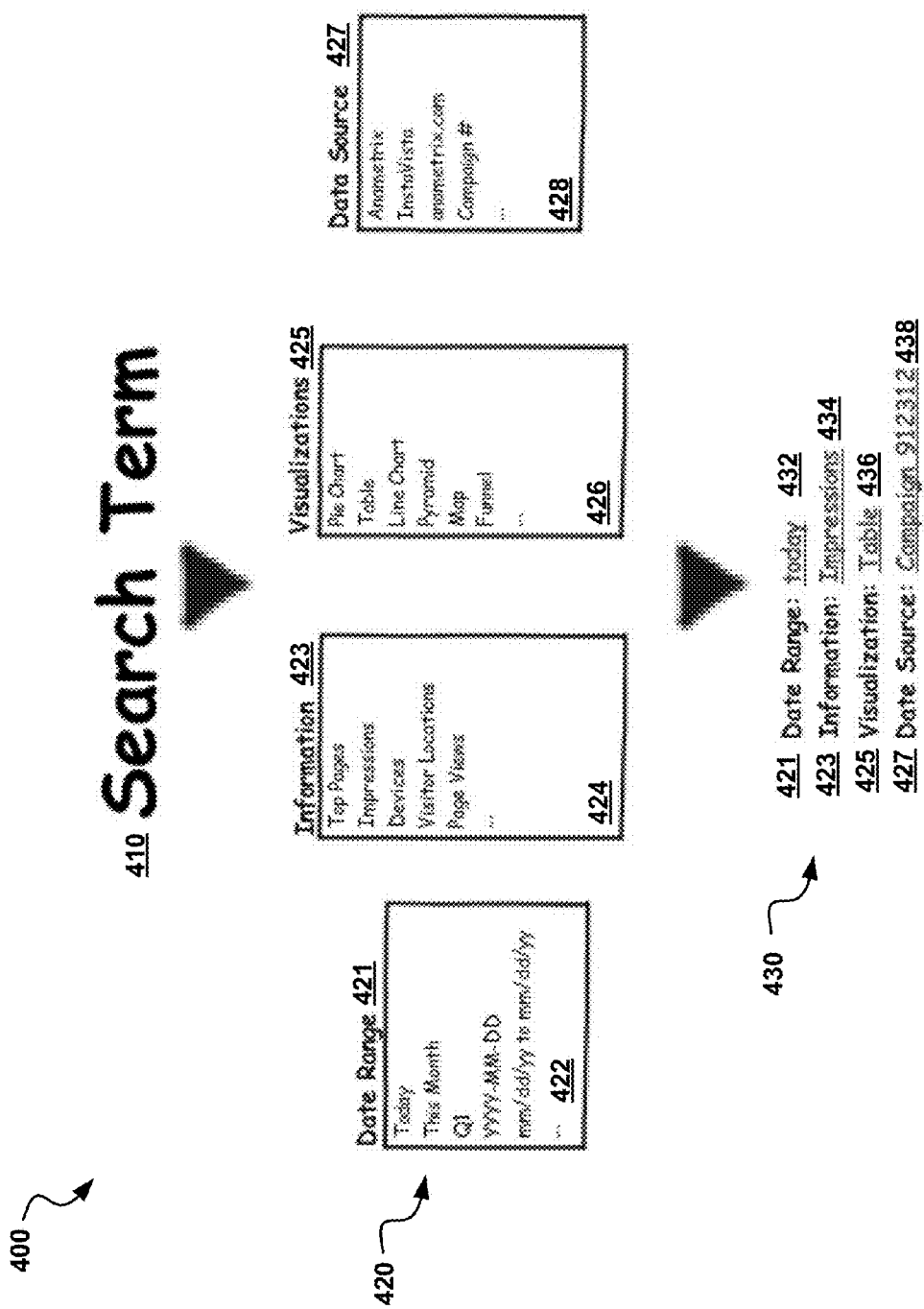
FIG. 4 illustrates details of an embodiment of search term processing for use in a Social Analytics system.

In order to parse search terms, a number of possible algorithms may be used. For example, in embodiments where the previous categories (e.g., information, data sources/sites, date range, and visualization) are used, one appropriate algorithm for use is a decision tree algorithm (which may similarly be applied when additional and/or different categories are used). In implementing a decision tree algorithm, an input string may be analyzed using dictionaries to identify a best matching case (or cases). An example of this is shown in flowchart embodiment 400 in FIG. 4, wherein a search term 410, such as the search strings described previously with respect to FIG. 3, may be parsed and the parsed terms matched at stage 420 to a set of categories. In the example shown, categories include those described with respect to FIG. 3, including a Date Range 421, Information 423, Visualizations 425, and a Data Source 427. Each category may include a set of potential matching parameters, such as date formats 422, information types 424, visualization types 426, and data sources 428. Based on the matching parameters, a closest match (or matches) may be selected at stage 430. For example, for an applied search term "Number of Impressions Today in Table Form," the corresponding results 430, including a match of the term "today" 432 with Date Range category 421, "impressions" 434 with category "Information" 423, "Table" 436 with category "Visualization" 425, and "Campaign 912312" 438 with the Data Source category 427. By using this approach, appropriate search criteria may be identified and then used to search for relevant information.

Some embodiments may be implemented in a plug-in and use an application programming interface (API), such as described in U.S. Provisional Patent Application Ser. No. 61/442,467, filed Feb. 24, 2011, entitled METHODS AND APPARATUS FOR INTERACTIVE DATA MANAGEMENT USING AN APPLICATION PLUG-IN, and in U.S. Utility patent application Ser. No. 13/396,362, filed Feb. 14, 2012, entitled METHODS AND APPARATUS FOR INTERACTIVE DATA MANAGEMENT USING AN APPLICATION PLUG-IN, both of which are incorporated by reference herein. By including the search functionality in a plugin, SPOTLIGHT (e.g., a system-wide desktop feature provided on MAC computer systems) may be supported in MAC, or corresponding features provided on Windows WINDOWS systems for searches. In general, plug-ins for various operating systems may be provided to allow searching directly through the operating system's search bar, which may include use of NLP as described herein, without the need to launch a specific browser or standalone application.

As noted previously, one aspect of the present invention relates to providing users with the capability to share content, such as finished reports, as well as specific graphs, charts, or other visually presented information, with other users, such as coworkers. This may be implemented as shown with respect to the example display 500 of FIG. 5. For example, to share a report, a user may be provided with a menu or other interface option, such as Report menu option 520 (or similar or equivalent option to select a report) to select a report. The report may include various information including visualizations, such as visualization 532 and 534.

Figure 6A:
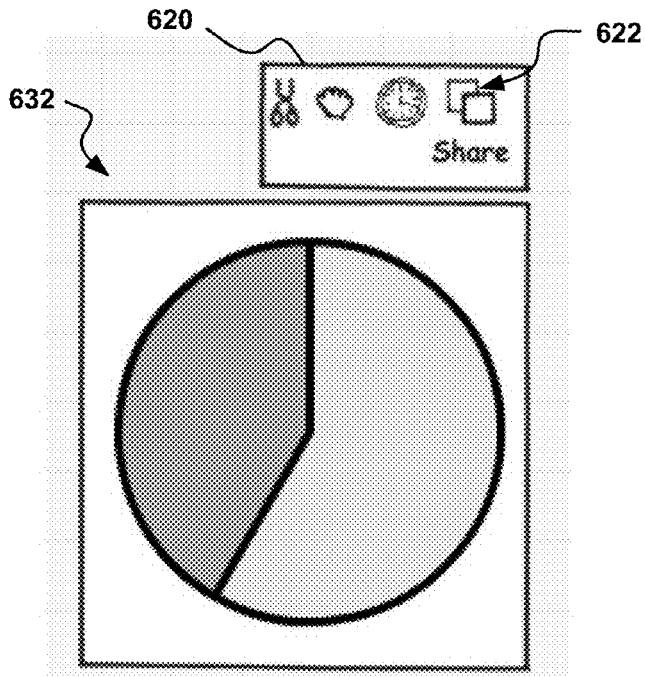
FIGS. 6A & 6B illustrate details of an embodiment of a sharing interface for report elements such as visualizations in a Social Analytics system.

The Report menu 520 may include various submenus 522, including a "share" sub-menu 523 that a user may select to share the report with other users, as well as other submenus, such as the various submenus shown in sub-menu 523. A different interface mechanism may be used to share visualizations or other information, such as visualizations 532 and 534. This may be done by an attached "pop-up" menu or box, such as with pop-up window 620 as shown in FIG. 6A, which may be attached or associated with a visualization 632 and may pop-up during certain user actions, such as moving a mouse cursor over or near the visualization. An image, icon, or other representation of the chart/graph/report (or other visualization) may similarly be presented to the user. The pop-up window 620 may include a "share" icon 622 or other selection mechanism to initiate sharing of the visualization.

Figure 5:
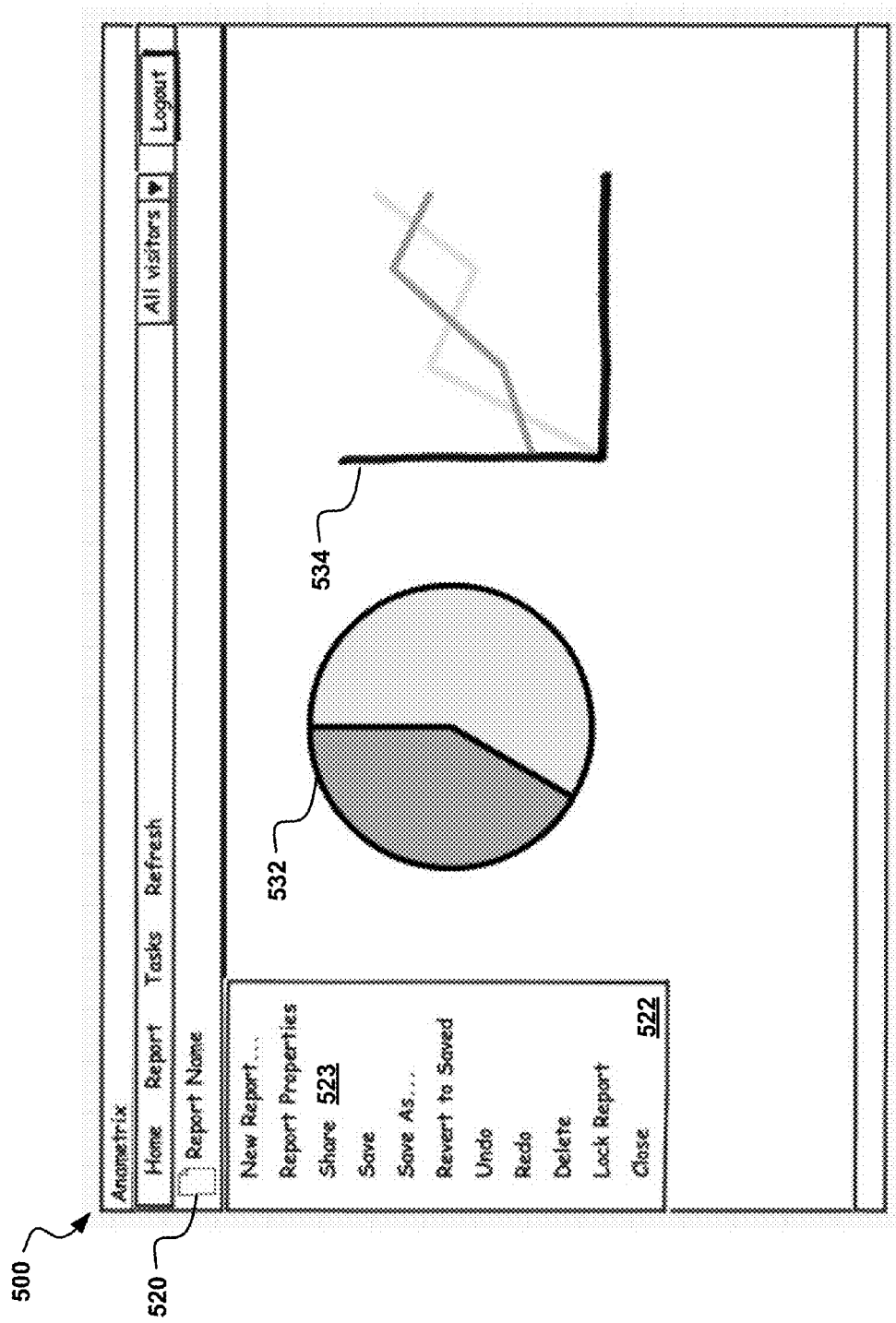
FIG. 5 illustrates details of an embodiment of an example report and sharing interface as may be used in a Social Analytics system.
Figure 6B:
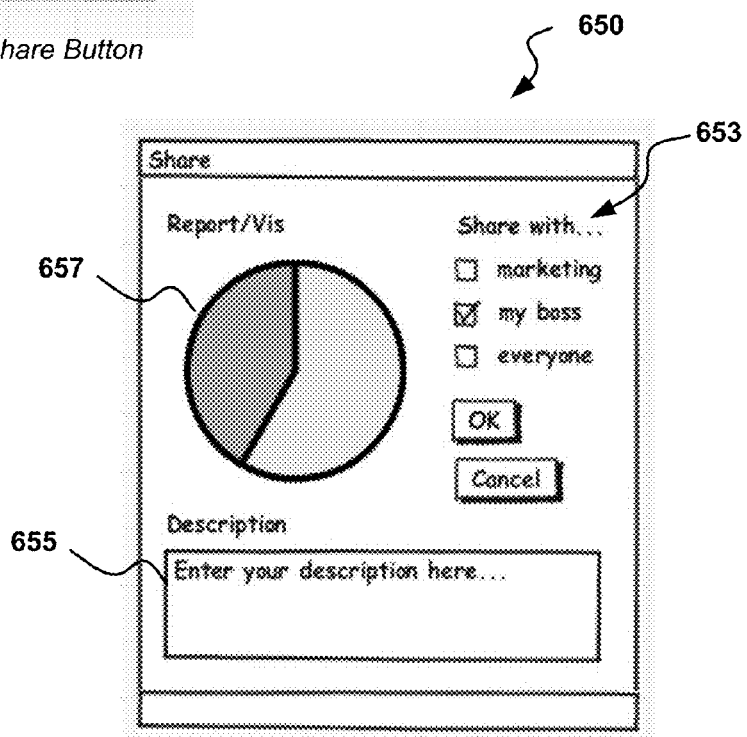

In either the example shown in FIG. 5 or the example shown in FIG. 6A, once a user selects the share menu option, additional actions may be done, such as providing a menu or other input option to allow a user to enter a description or other information, which may be presented to other users alongside the report/chart. An example of such a window is shown in window 650 of FIG. 6B, where options such as a listing 653 of available users (who with to share), a description box 655 for entering text, an image of the report/chart (or other visualization) 657, and/or other images or information (not shown) may be provided.

Figure 7A:
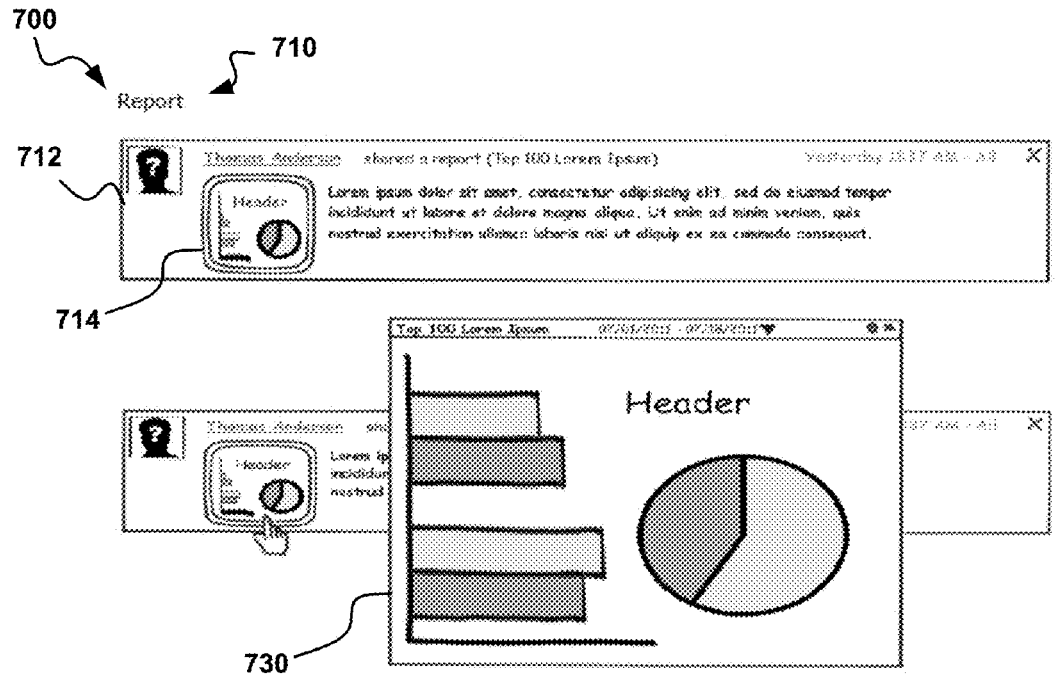
FIGS. 7A & 7B illustrate details of an embodiment of sharing posts in a Social Analytics system.
Figure 7B:
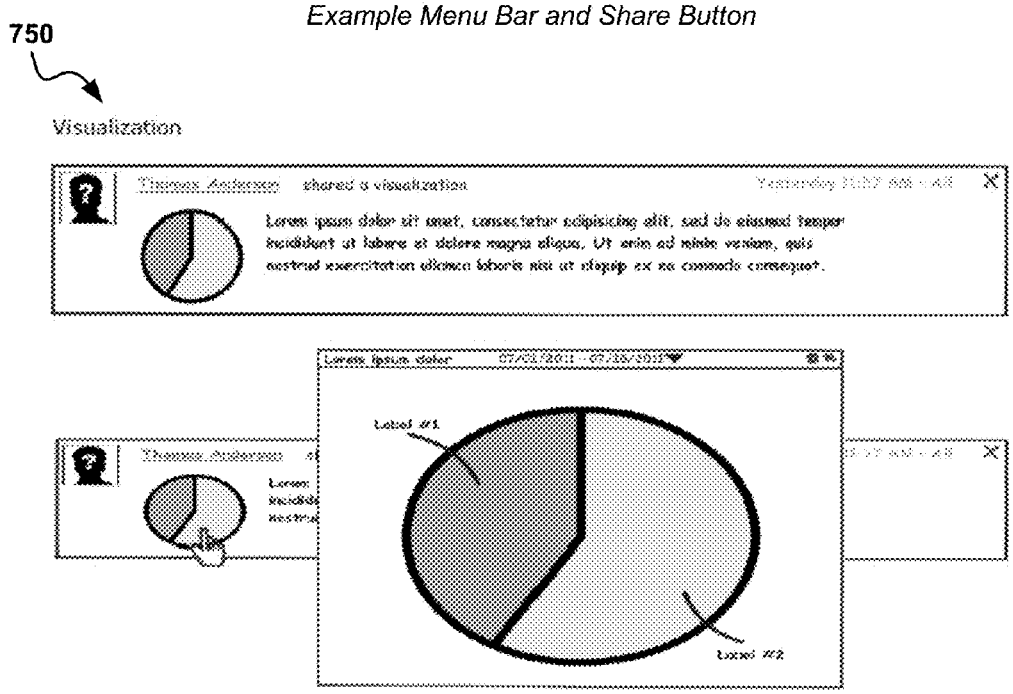

After a user has filled in any required elements of window 650, the user may select the "OK" button or make a similar or equivalent selection, after which the chart/graph/report will be posted to the flow of any selected users. An example of a flow update box 712 illustrating how information may be posted to a selected user's flow is shown in display 700 of FIG. 7A. For example, the presented information may include a description of the submitted information (e.g., a Report 710, a Visualization 730, etc.), as well as an information box, such as information box 160 as shown in FIG. 1, which may include information such as the user's photo, avatar, icon, business card, etc., text or other information submitted by the user, such as the information entered in the "Description" box of FIG. 6B, an icon or image 714 representing the report/chart, as well as other information (not shown). A pop-up window or similar or equivalent interface element, such as pop-up window 730, may be included to allow for addition user interaction, such as changing the parameters of reports (e.g., date or other ranges or scaling, maximizing sizing, or change other parameters of report or visualizations). A similar presentation for Visualizations, such as charts/graphs, is illustrated in display 750 of FIG. 7B.

Some embodiments may include alerting functions, such as described in Related U.S. Provisional Patent Application Ser. No. 61/477,993, filed Apr. 21, 2011, entitled METHODS AND SYSTEMS FOR PREDICTIVE ALERTING, and in U.S. Utility patent application Ser. No. 13/453,926, filed Apr. 23, 2012, entitled METHODS AND SYSTEMS FOR PREDICTIVE ALERTING, both of which are incorporated by reference herein. Similar to Reports, Alerts may be sent to a set of users and may appear in the users' flow. For example, a first user may create an alert and it may be processed such as described in the '993 or the '926 applications, with the alert then included in users' flows based on occurrence of the underlying event or events controlling the alert.

Figure 8A:
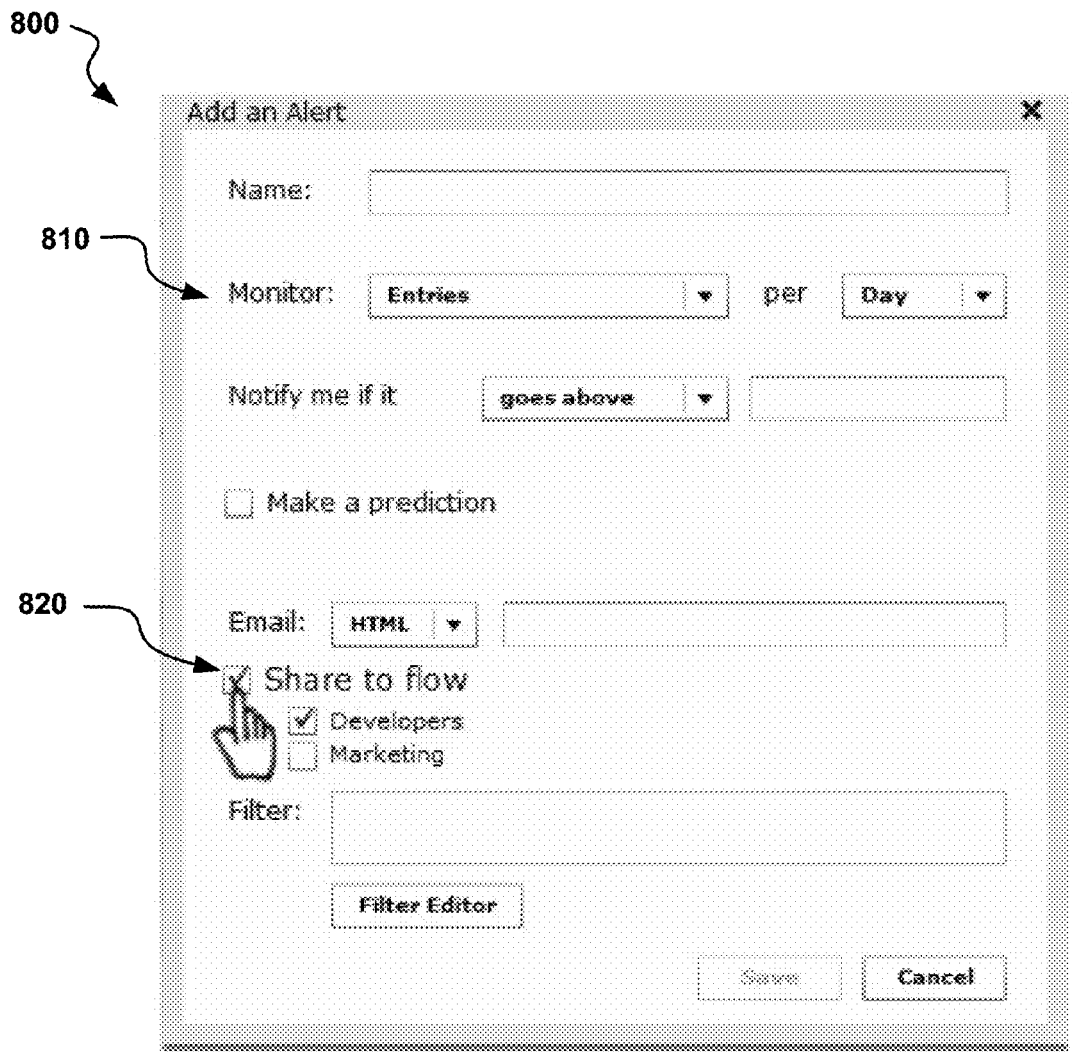
FIGS. 8A & 8B illustrate details of an embodiment of Alert generation and posting in a Social Analytics system.

An example embodiment of an Alert Creation window 800 is shown in FIG. 8A. A user may be provided with an interface 810 to enter alert controls and conditions, such as what is being monitored, how frequently, how notification may be done, whether predictions of occurrence of the alerting condition(s) should be done, and/or other alert or monitoring criteria. In addition, an interface 820 may be included to allow a user to select whether the alert response should be shared with other users' flows. These may be predefined groups of users such as Developers, Marketers, and/or other groups of users, and/or may be filtered users, which may be users selected based on properties or parameters associated with the users.

Figure 8B:
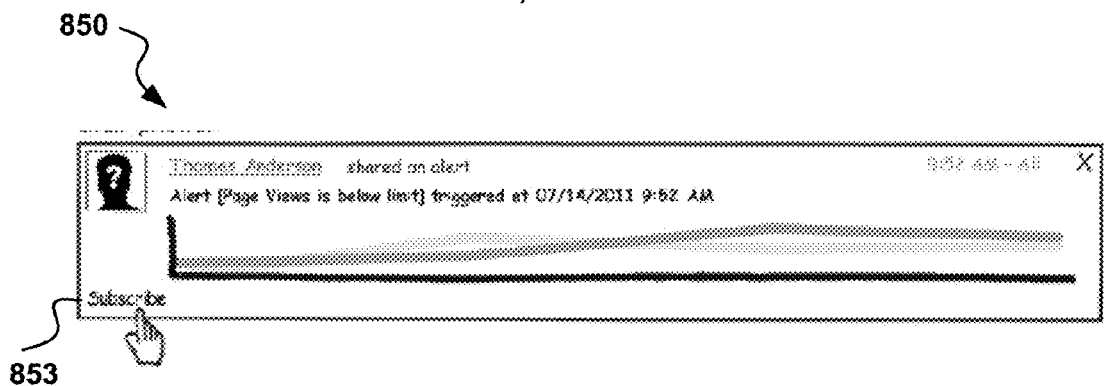

When an alert is triggered, a post may then be generated in the selected users' flows. An example of this is shown as post 850 of FIG. 8B. Users that see the post may be able to subscribe or otherwise interact with the alert to that future alerts may be presented to the users by email, voice message, or other communication methods. An example Subscribe menu selection button 853 is shown in FIG. 8B.

Figure 9A:
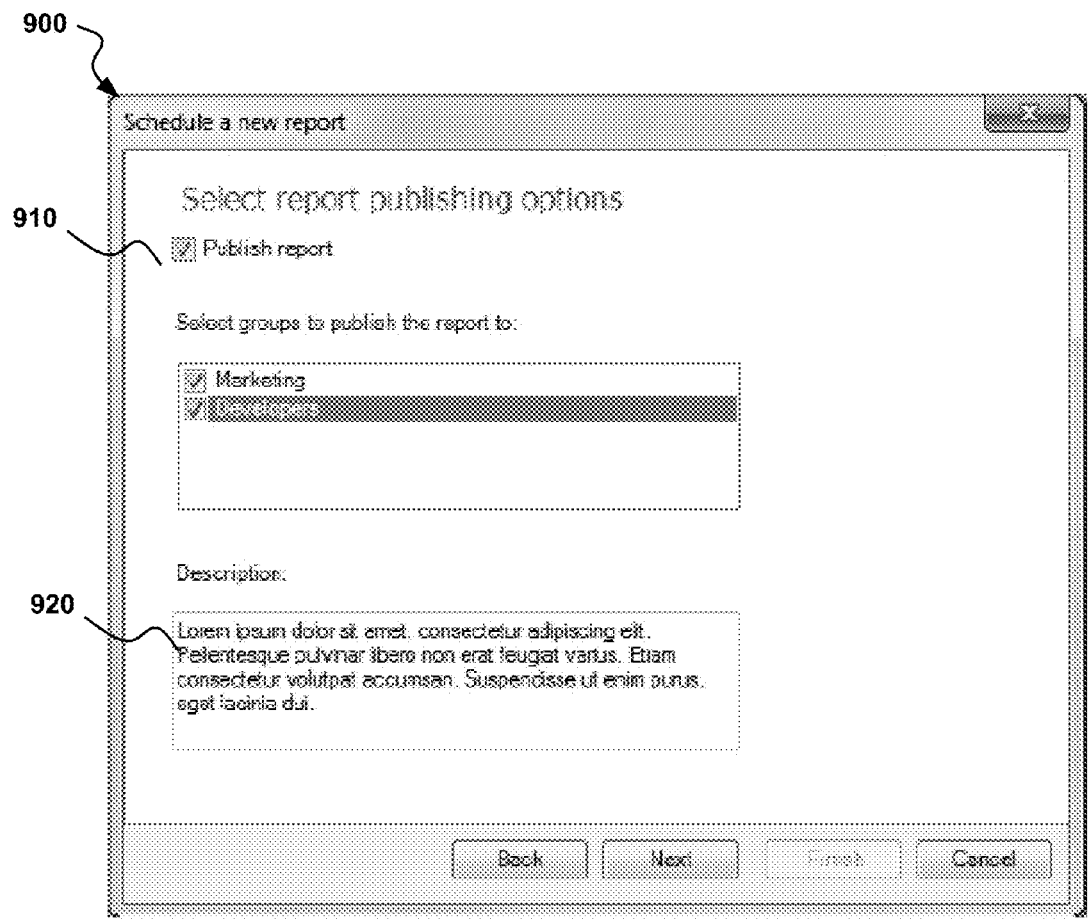
FIGS. 9A & 9B illustrate details of an embodiment of a report scheduling interface and scheduled report post in a Social Analytics system.

In addition to user generated or user controlled report presentation, in some embodiments, reports may be scheduled and automatically generated. For example, in one embodiment, a report may be scheduled using an add-on application, such as the add-on application to MICROSOFT EXCEL created by Anametrix, assignee of the instant application, for automating report creation. For example, a report may have a predefined format and predefined scheduling to determine the frequency of refresh. In the existing Anametrix application, the refreshed report is sent by email to appropriate users. In accordance with one aspect of the present invention, a scheduled report may also be generated and published, such as to the flows of designated users. An embodiment of an example report scheduling window 900 is shown in FIG. 9A, including a publication selection option 910 (which may include menus or other selection options to select an appropriate group of users for receipt of the scheduled reports), as well as a Description window 920 to allow users to enter text, such as described previously with respect to FIG. 6B.

Figure 9B:
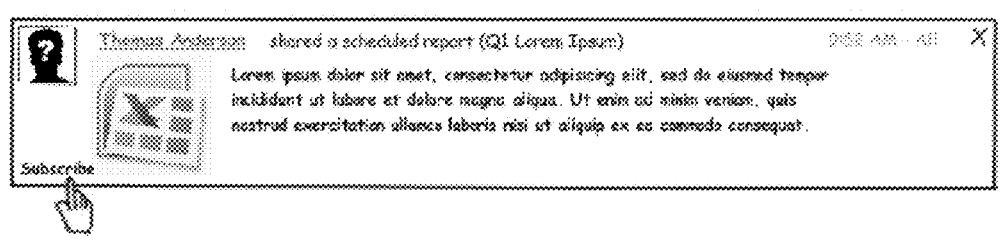

FIG. 9B illustrates a corresponding example post 950 to users' flow in response to generation of the scheduled report. The post may include similar information to that described previously with respect to FIG. 8B, including Description and a Subscription option.

Figure 10A:
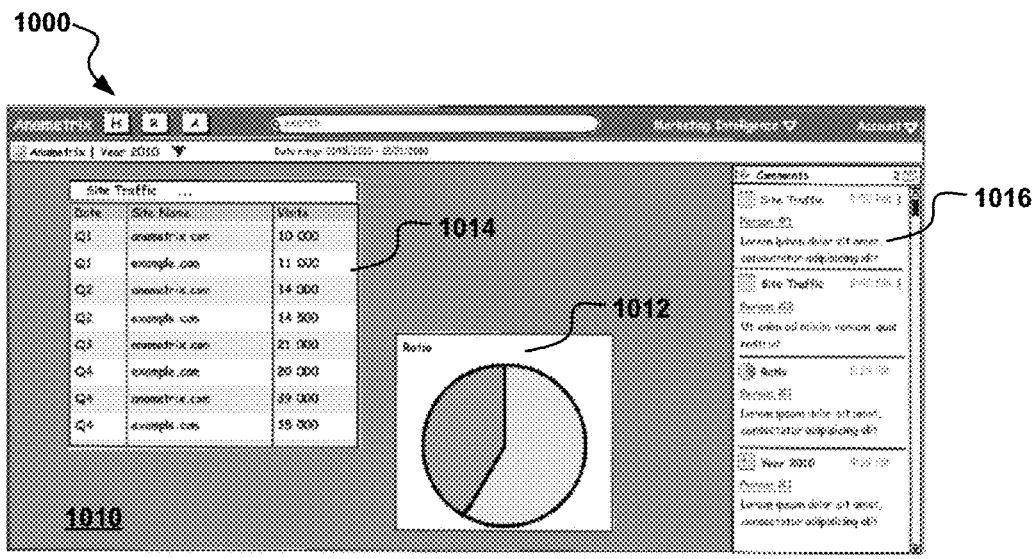
FIGS. 10A & 10B illustrate details of an embodiment of Interactive Reports and Visualizations in a Social Analytics system.

Another aspect of the present invention relates to interactive report generation and user interaction through users' flows. Interactive reports are reports that allow multiple users to interact with the report and/or associated information. For example, FIG. 10A illustrates an example embodiment 1000 of an Interactive Report and Visualization. When a report is published to users' flows, the users may be provided with an interface to comment on the report and/or on specific elements, such as tables, visualizations, text, or other elements. An example comments panel 1016 is shown, where users may provide comments elements of a report 1010 such as visualization 1012 (e.g. the "Ratio" pie chart), tabular information 1014 (e.g., the "Site Traffic" table), or other elements (not shown). The comments panel 1016 may include information associated with the commenting user, such as the element which is being commented on (e.g., Ratio, Site Traffic, Year, etc.), the user making the comment, the time/date, as well as textual or graphically provided comments, data, or information.

Figure 10B:
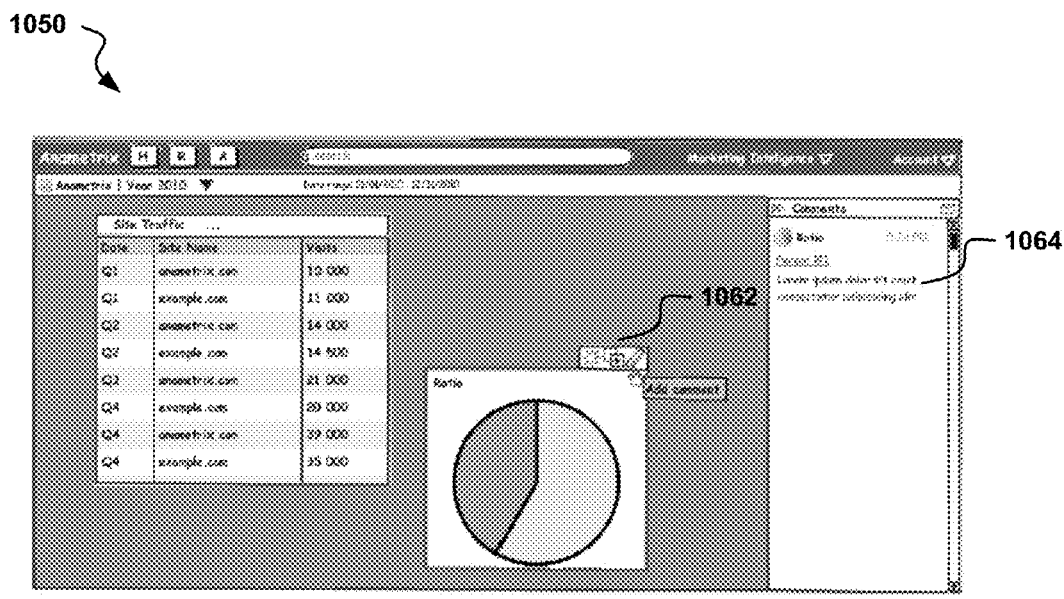

FIG. 10B illustrates a similar diagram 1050 for multiple user interaction through users' flows for a Visualization. As shown in FIG. 10B, in addition to commenting on a report or specific report elements as shown in FIG. 10A, an interface option may be provided to allow users to comment on specific elements, such as Visualization 1012 as shown. This may be implemented by a pop-up menu 1062 or other user interface mechanism to allow a user to add a comment 1064 as shown. The comments displayed to other users within this interaction may be limited to comments related to the specifically selected element (e.g., Visualization 1012 in this example).

Figure 11:
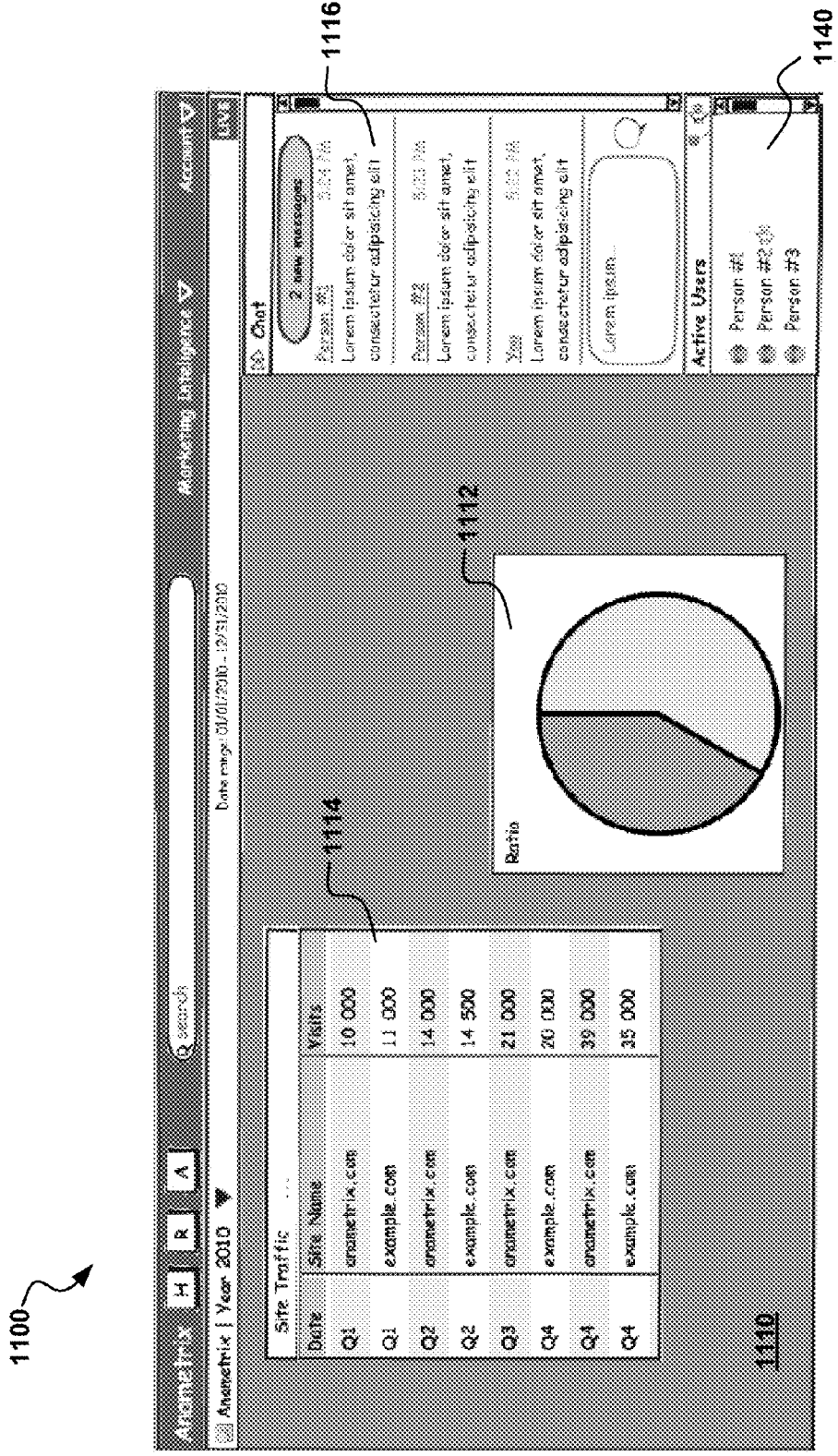
FIG. 11 illustrates details of an embodiment of a Live Reporting window in a Social Analytics system.

Another aspect of the present invention relates to live reports. Live reports are shared reports that provide for real time updating and/or interaction. FIG. 11 illustrates an example embodiment of a live report window 1100 for interaction with report 1110, which includes Visualization 1112, Table 1114, Comments panel 1116, as well as an Active Users panel 1140. One user may be allowed to actively edit, update, change parameters of (e.g., date, scaling, etc.) or other information associated with the report and/or with specific elements such as Visualization 1112 or Table 1114, while other users receive and can view the updates in real time. The Active Users panel 1140 may be provided to each active user to monitor which others are also interacting with the report. In addition, interaction may be provided through use of an audio connection, such as through use of a microphone, and/or a video connection, such as through use of a webcam. This information may be audibly and/or visually presented to all users capable of audio or video interaction. In the example shown in FIG. 11, four users are interacting (e.g., the user who is receiving window 1100, as well as Persons 1-3). Person #2 is actively communicating (as shown by the microphone icon) with Person #1 and Person #3.

Figure 12:
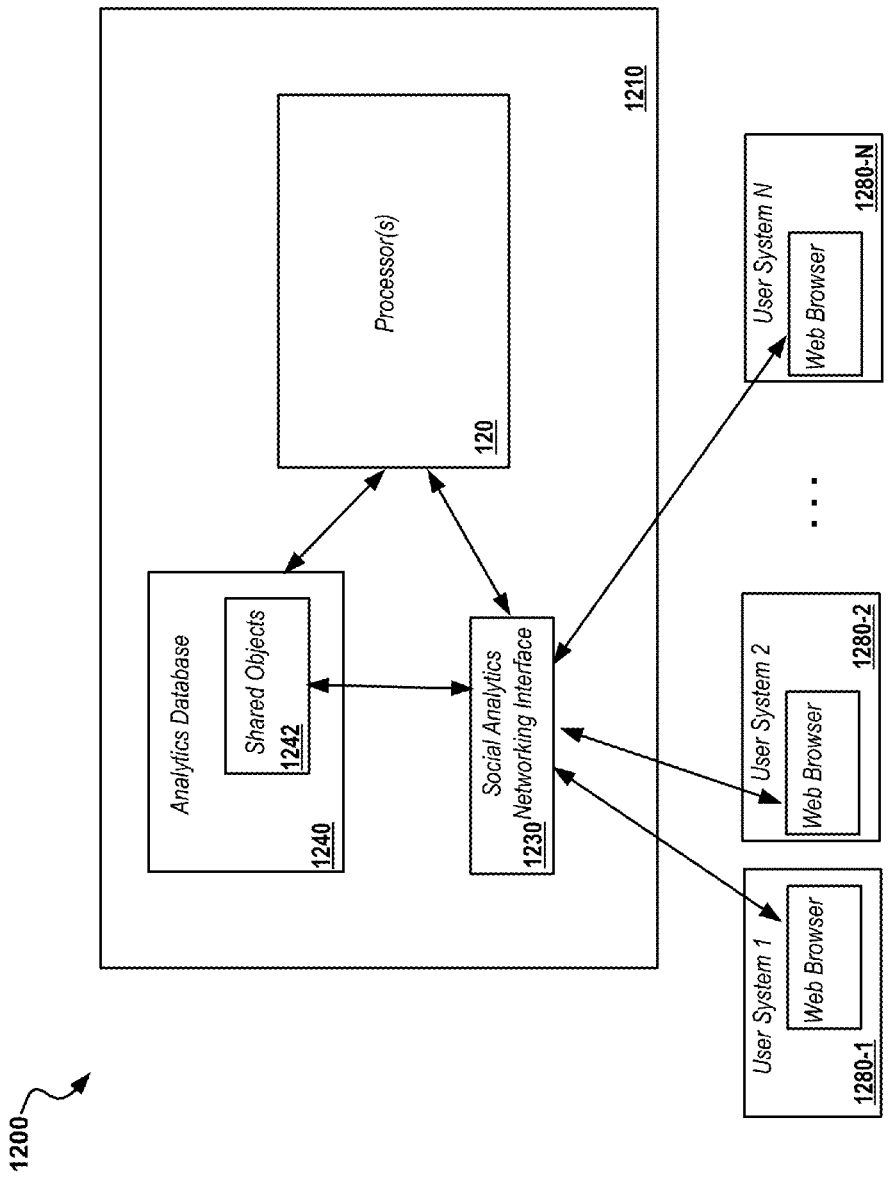
FIG. 12 illustrates details of an embodiment of a Social Analytics system.

FIG. 12 illustrates details of an embodiment 1200 of a Social Analytics system. System 1200 may include a core element of a server system 1210, which may include one or more servers, as well as associated components such as databases, network interfaces, displays, and other related computer system components. Server system 1210 may be a single system or may be implemented as a distributed system spanning multiple physical areas and multiple physical computing components.

Multiple users 1280 may be provided with controlled access to system 1210, such as via wired networks, wireless networks, the Internet, or via other communication connections. Each user may interact with system 1210 using a standard web browser, however, in some implementations a plug-in or standalone application may be executed, in whole or in part, on the user systems 1280. As described previously, multiple users 1280 may interact using a Social Analytics interface such as shown in FIG. 1. For example, a user on User System 1 (1280-1) may interact, via a user interface such as shown in FIG. 1, with users on User System 2 and User System 3 (and/or with other users on other systems not shown).

Within server system 1210, one or more processors 120 may be coupled to one or more analytics databases 1240, which may contain shared objects 1242, such as reports, visualizations, tables, etc. Users may interact with system 1210 via one or more networking interfaces 1230 to implement the functions described herein, including providing user communications, report distribution, live report updating, and other user interactions over the social analytics network.

Figure 13:
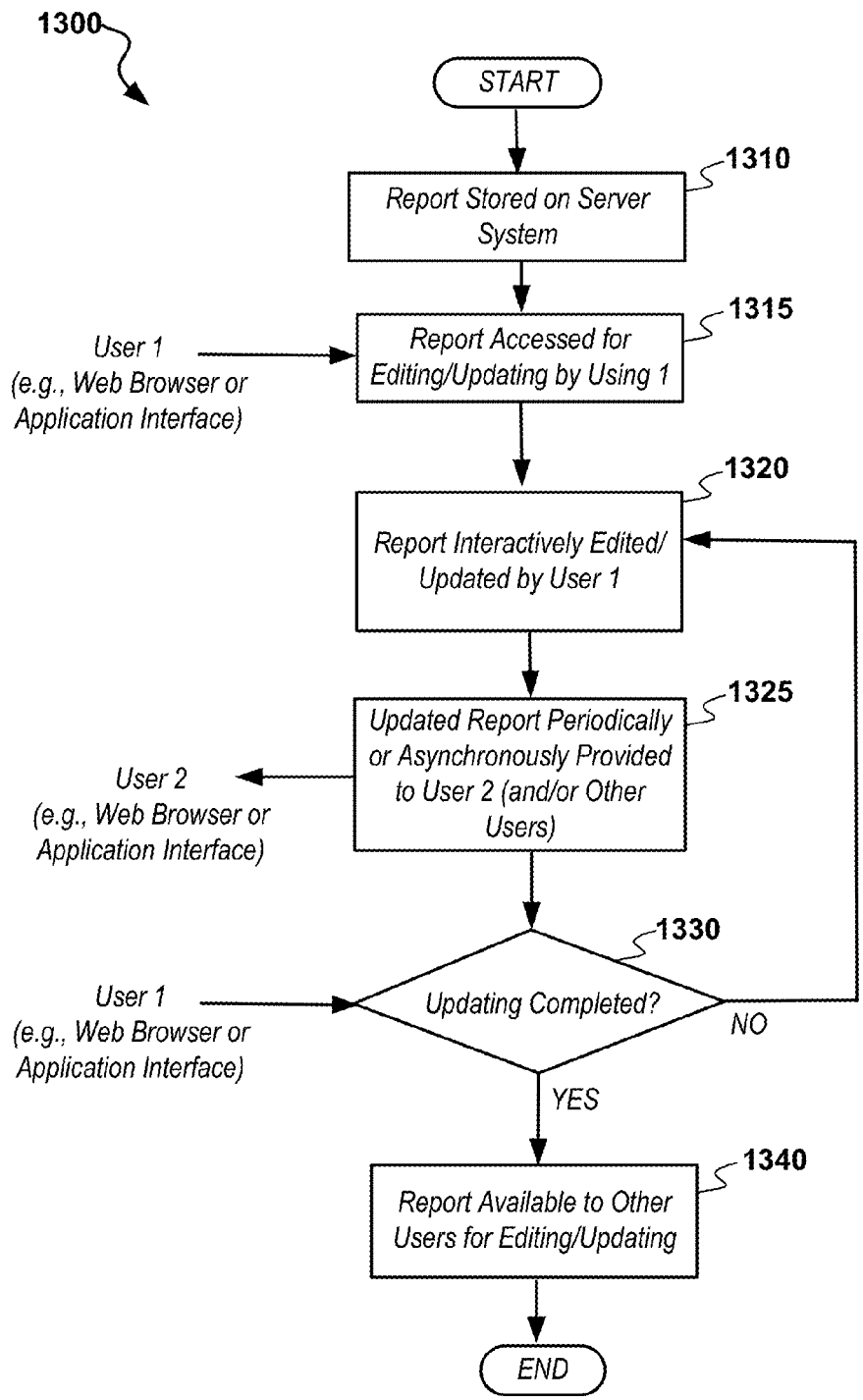
FIGS. 13, 14, 15 and 16 illustrate details of embodiments of processes for providing interactive editing in a Social Analytics system.

FIG. 13 illustrates details of an embodiment of a process 1300 for providing interactive editing and reporting on a social analytics system, such as described previously with respect to FIG. 11. At stage 1310, a report, which may be generated automatically or by one or more users, may be stored on a Social Analytics system, such as the system shown in FIG. 12. At stage 1315, the report may be accessed by a first user (e.g., User 1) via a web browser such as shown in FIG. 12, or via a standalone application or plug-in to an existing application. At stage 1320, the user may edit/update or otherwise interact with the report, and the updated report may be periodically provided to other users at stage 1325 (e.g., to a second user, User 2, and/or to other users).

At decision stage 1330, a decision may be made as to whether the report editing/updating is completed. This may be initiated by an action from User 1, such as by indicating completion of editing and "checking-in" the report. If editing is not completed, processing may return to stage 1320 for further editing/updating. Once editing is completed, the report may then be available at stage 1340 for other users to access/edit. Upon access by other users, process 1300 may be repeated. Additional functions, such as providing user comments associated with the object(s) being edited as described previously herein, may also be implemented in conjunction with process 1300.

Figure 14:
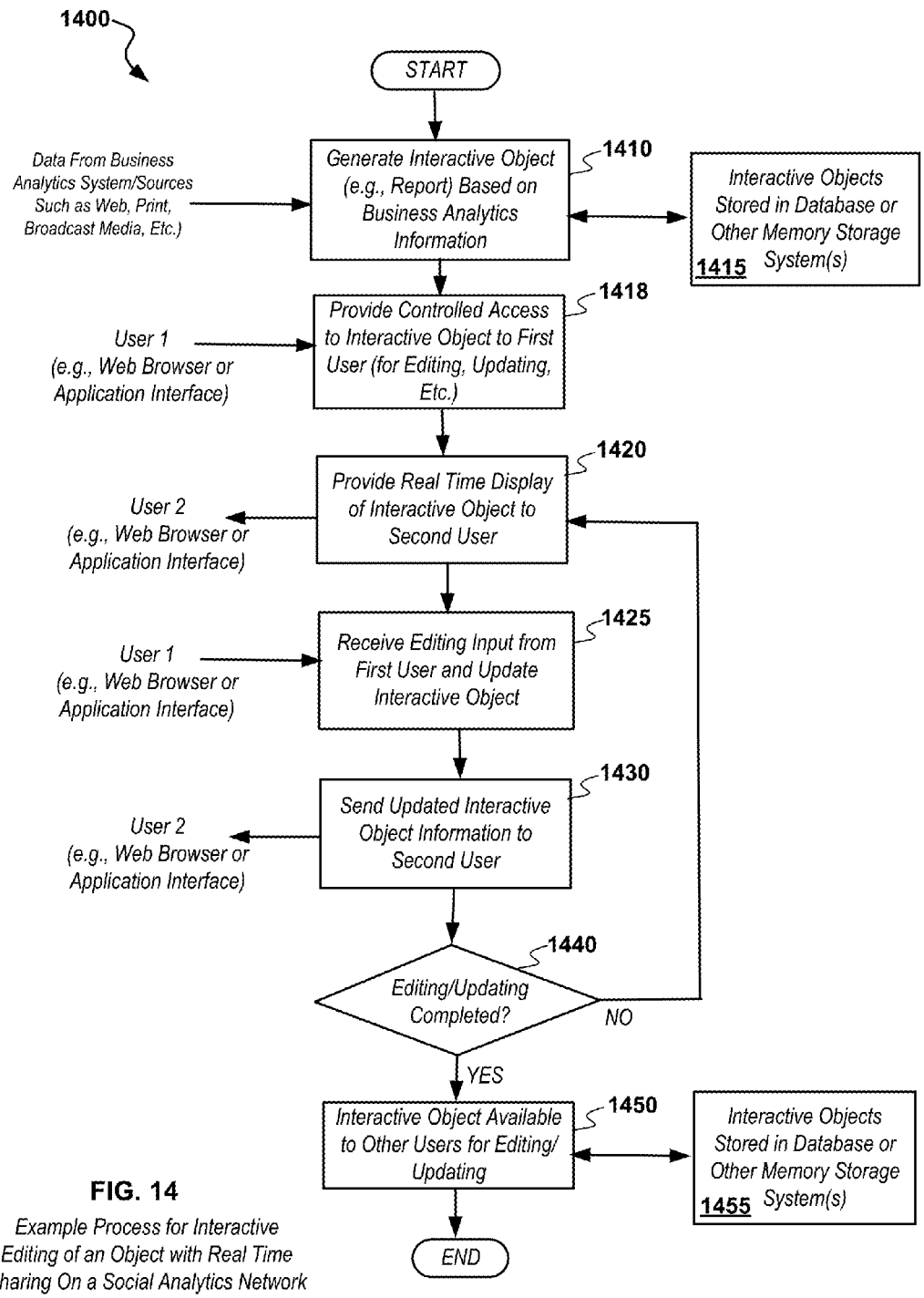

FIG. 14 illustrates details of an embodiment of a process 1400 for interactive editing of an object such as a report or visualization on a Social Analytics system. At stage 1410, a report may be generated based on business analytics information, such as automatically as described previously herein or by one or more users. The report may be stored at stage 1415 in a database of a Social Analytics system, such as database 1240 of FIG. 12. A first user (User 1) may be provided with controlled access to the report at stage 1418, such as for editing, updating, etc. At stage 1420, a real time display of the report may be provided to a second user (User 2), and the Social Analytics system may receive input from User 1 at stage 1425 related to an edit or change to the report or other object. At stage 1430, updated information, responsive to the edit/change at stage 1425, may be provided to User 2 so that the information on a user interface display may be updated. At a decision stage 1440, a decision may be made as to whether editing is completed. If not, processing may return to stage 1420 and be repeated. Alternately, if processing is completed, the report or other interactive object may be made available to other users at stage 1450. The report or other interactive object may be stored at stage 1455. Additional functions, such as providing user comments associated with the object(s) being edited as described previously herein, may also be implemented in conjunction with process 1400.

Figure 15:
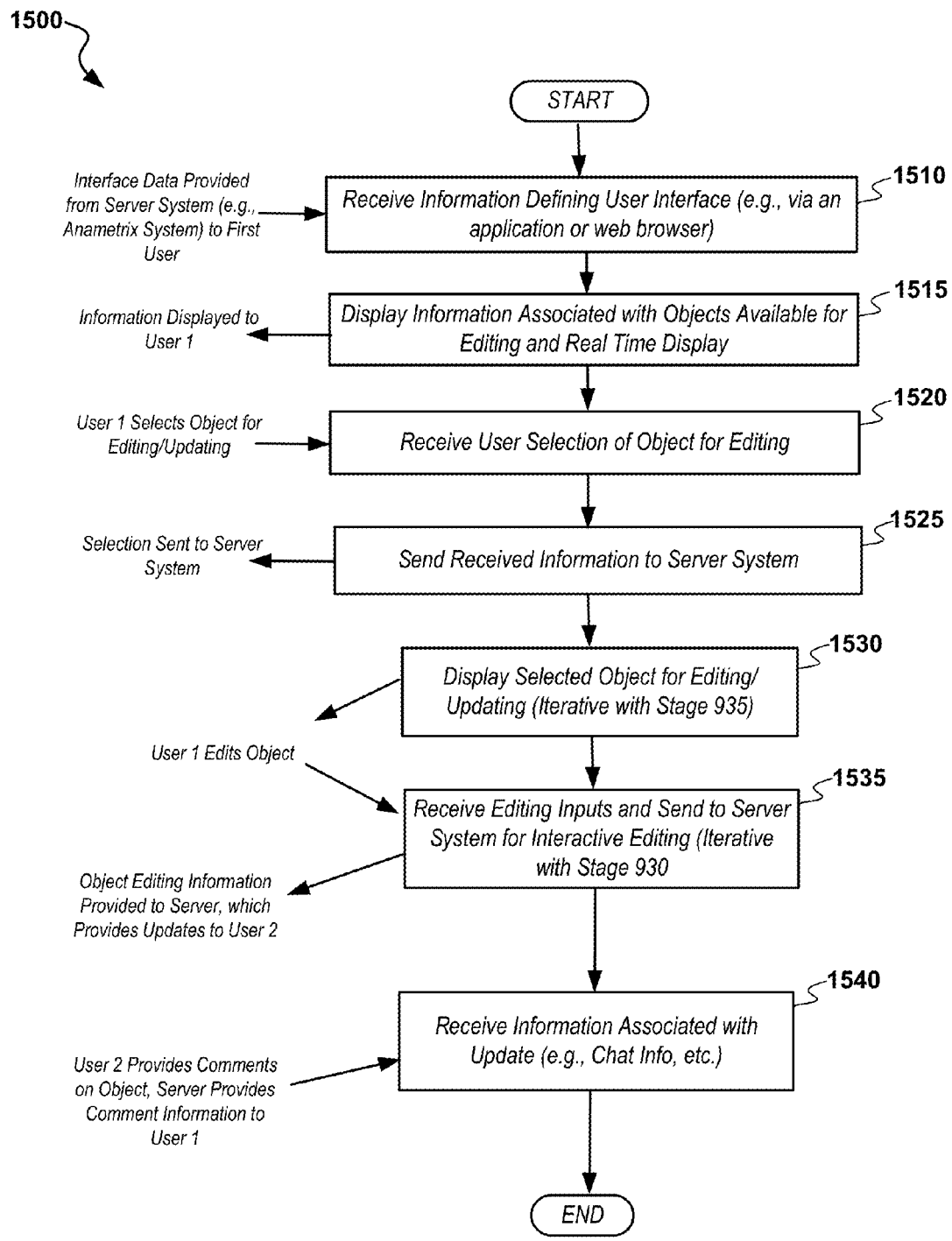

FIG. 15 illustrates details of an embodiment of a process 1500 for interactive editing of an object with real time sharing on a Social Analytics system. At stage 1510, information defining a user interface, such as the user interface 100 shown in FIG. 1, may be received at a computer or other device of a first user for rendering on the first user's display. At stage 1515, the information may be displayed to the first user, including an object, such as a report or visualization, for editing by the first user. At stage 1520, the first user may edit the object, such as by interacting with the user interface to change or update the object, and the updating information may be sent at stage 1525 to a Social Networking system in communication with the first user.

At stage 1530 and 1535, the first user may interactive edit/update the object, and the editing/updating information may correspondingly be provided to the Social Analytics system (where it may further be shared with other users). At stage 1540, a second user (and/or other users) may provide comments on the updating/editing of the object, which may then be provided from the Social Analytics system to the first user. The comments may then be displayed on the user interface of the first user (and/or in a comments panel of the other users).

Figure 16:
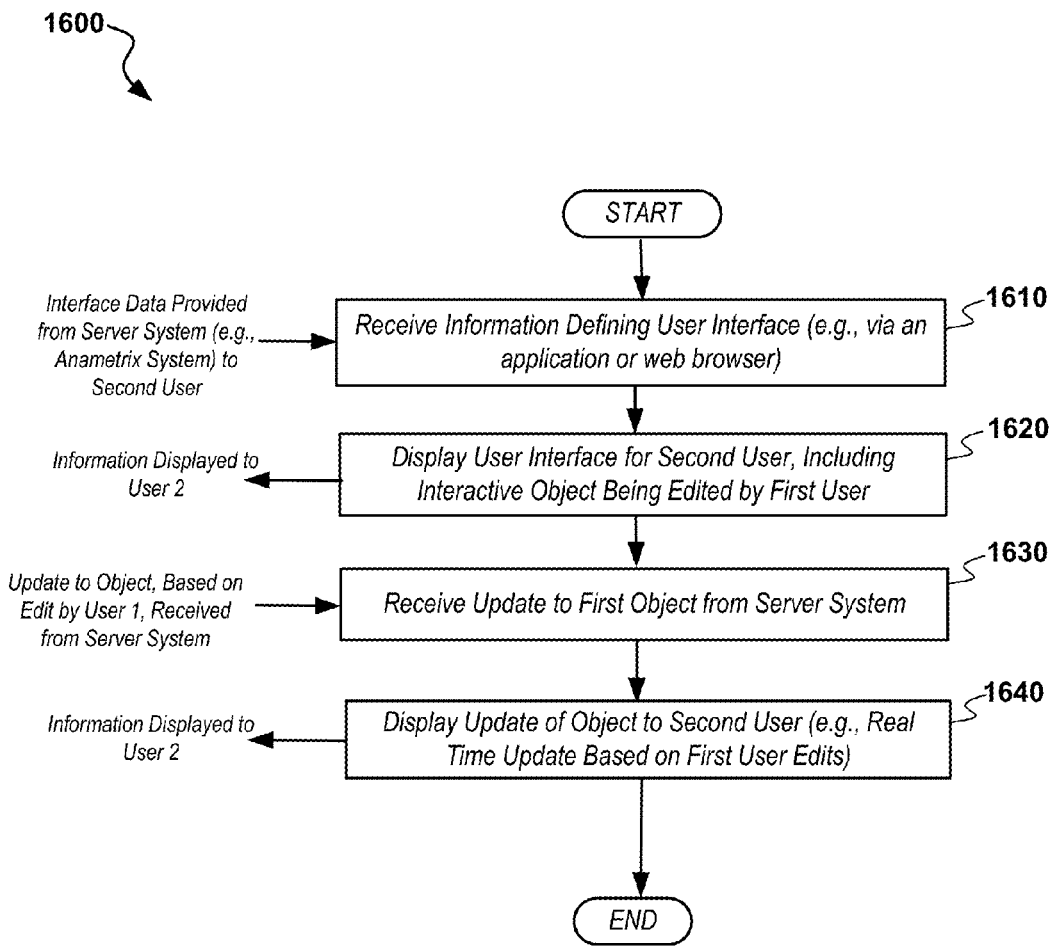

FIG. 16 illustrates details of an embodiment of a process 1600 for providing interactive editing of an object such as a report or visualization with real time sharing on a Social Analytics system. At stage 1610, a user may receive information defining a user interface, such as interface 100 as shown in FIG. 1, to render the interface on a second user's display. At stage 1620, the interface may be displayed on the user's display, including a display of a first object, such as a report or a visualization, being edited/updated by a first user. At stage 1630, information defining an update to the first object may be received, such as information describing an updated first object to be displayed to the second user. At stage 1640, the updated object may then be displayed to the second user in real time based on the first user's edits. Additional information, comments, or other communication (such as by webcam, audio, text, etc.) may be further combined with process 1600 to facilitate user interaction as described previously herein.

In some configurations, the apparatus or systems described herein may include means for implementing features or providing functions described herein. In one aspect, the aforementioned means may be a module including a processor or processors, associated memory and/or other electronics in which embodiments of the invention reside, such as to implement Social Analytics functions as described herein. These may be, for example, modules or apparatus residing in computer systems, mobile phones, server systems, or other electronic or computing systems.

In one or more exemplary embodiments, the electronic functions, methods and processes described herein and associated with Social Analytics functions may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, computer program products comprising computer-readable media including all forms of computer-readable medium except, to the extent that such media is deemed to be non-statutory, transitory propagating signals.

It is understood that the specific order or hierarchy of steps or stages in the processes and methods disclosed herein are examples of exemplary approaches. Based upon design preferences, it is understood that the specific order or hierarchy of steps in the processes may be rearranged while remaining within the scope of the present disclosure.

Those of skill in the art would understand that information and signals, such as video and/or audio signals or data, control signals, or other signals or data may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, electro-mechanical components, or combinations thereof. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative functions and circuits described in connection with the embodiments disclosed herein with respect to Social Analytics systems may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps or stages of a method, process or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The disclosure is not intended to be limited to the aspects shown herein, but is to be accorded the full scope consistent with the specification and drawings, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the disclosure is not intended to be limited to the aspects shown herein but is to be accorded the widest scope consistent with the principles and novel features disclosed herein.

We claim:

1. A method for providing social analytics information, comprising:
    receiving, by a computing device, a request to create a predictive alert based on one or more variables of web analytics data for a website, wherein the request to create the predictive alert includes a request to provide the predictive alert on a flow of a first user of a social analytics system;
    monitoring the one or more variables of the web analytics data for the website;
    determining, based on the monitoring the one or more variables of the web analytics data for the website, a prediction of when the one or more variables are predicted to meet one or more required conditions of the predictive alert;
    providing the predictive alert on the flow of the first user of the social analytics system, wherein the predictive alert on the flow of the first user of the social analytics system includes an interface option to subscribe to the predictive alert;
    receiving, from a device of a second user of the social analytics system, via the interface option to subscribe to the predictive alert, a different request to provide the predictive alert on a flow of the second user of the social analytics system; and
    providing the predictive alert on the flow of the second user of the social analytics system.

2. The method of claim 1, comprising:
    providing the predictive alert to a device of the first user by email.

3. The method of claim 1, comprising:
    providing the predictive alert to a device of the first user by a cellular phone message.

4. The method of claim 3, wherein the cellular phone message is a text message.

5. The method of claim 3, wherein the cellular phone message is a voice message.

6. The method of claim 1, wherein the web analytics data comprises one or more of results of an advertising campaign, a number of hits on the website, inventory information, and sales information.

7. The method of claim 1, comprising:
receiving, in the request to create the predictive alert, a selection of whether the predictive alert should be shared to a flow of a different user.

8. The method of claim 7, wherein receiving, in the request to create the predictive alert, the selection of whether the predictive alert should be shared to the flow of the different user comprises receiving a selection of a group that the predictive alert is to be shared with, wherein the different user is a member of the group.

9. The method of claim 1, comprising:
receiving, in the request to create the predictive alert, an indication of how frequently the monitoring should occur,
wherein the monitoring the one or more variables of the web analytics data for the website is performed according to the indication of how frequently the monitoring should occur.

10. The method of claim 1, wherein receiving the request to create the predictive alert comprises receiving, from an add-on to a spreadsheet application, the request to create the predictive alert.

11. The method of claim 1, comprising:
generating a graph of the web analytics data for the website; and
posting the graph of the web analytics data for the website to the flow of the first user based on monitoring the one or more variables of the web analytics data for the website.

12. The method of claim 1, comprising:
receiving, via a comment interface of the social analytics system, a comment on the predictive alert on the flow of the first user of the social analytics system, wherein the comment on the predictive alert comprises a link that, when activated, provides access to a different document related to the web analytics data for the website.

13. A system comprising:
one or more processors; and
a non-transitory memory storing executable instructions that, when executed by the one or more processors, cause the system to:
receive a request to create a predictive alert based on one or more variables of web analytics data for a website, wherein the request to create the predictive alert includes a request to provide the predictive alert on a flow of a first user of a social analytics system;
monitor the one or more variables of the web analytics data for the website;
determine, based on monitoring the one or more variables of the web analytics data for the website, a prediction of when the one or more variables are predicted to meet one or more required conditions of the predictive alert;
provide the predictive alert on the flow of the first user of the social analytics system, wherein the predictive alert on the flow of the first user of the social analytics system includes an interface option to subscribe to the predictive alert;
receive, from a device of a second user of the social analytics system, via the interface option to subscribe to the predictive alert, a different request to provide the predictive alert on a flow of the second user of the social analytics system; and
provide the predictive alert on the flow of the second user of the social analytics system.

14. The system of claim 13, wherein the executable instructions, when executed by the one or more processors, cause the system to:
provide the predictive alert to a device of the first user by email.

15. The system of claim 13, wherein the executable instructions, when executed by the one or more processors, cause the system to:
provide the predictive alert to a device of the first user by a cellular phone message.

16. The system of claim 15, wherein the cellular phone message is a text message.

17. The system of claim 15, wherein the cellular phone message is a voice message.

18. The system of claim 13, wherein the executable instructions, when executed by the one or more processors, cause the system to:
receive, in the request to create the predictive alert, an indication of how frequently monitoring the one or more variables of the web analytics data for the website should occur,
wherein monitoring the one or more variables of the web analytics data for the website is performed according to the indication of how frequently the monitoring should occur.

19. Non-transitory computer-readable media storing executable instructions that, when executed by one or more processors, cause a system to:
receive a request to create a predictive alert based on one or more variables of web analytics data for a website, wherein the request to create the predictive alert includes a request to provide the predictive alert on a flow of a first user of a social analytics system;
monitor the one or more variables of the web analytics data for the website;
determine, based on monitoring the one or more variables of the web analytics data for the website, a prediction of when the one or more variables are predicted to meet one or more required conditions of the predictive alert;
provide the predictive alert on the flow of the first user of the social analytics system, wherein the predictive alert on the flow of the first user of the social analytics system includes an interface option to subscribe to the predictive alert;
receive, from a device of a second user of the social analytics system, via the interface option to subscribe to the predictive alert, a different request to provide the predictive alert on a flow of the second user of the social analytics system; and
provide the predictive alert on the flow of the second user of the social analytics system.

20. The non-transitory computer-readable media of claim 19, wherein the executable instructions, when executed by the one or more processors, cause the system to:
provide the predictive alert to a device of the first user by email.

21. The non-transitory computer-readable media of claim 19, wherein the executable instructions, when executed by the one or more processors, cause the system to:
provide the predictive alert to a device of the first user by a cellular phone message.

22. The non-transitory computer-readable media of claim 21, wherein the cellular phone message is a text message.

23. The non-transitory computer-readable media of claim 21, wherein the cellular phone message is a voice message.

24. The non-transitory computer-readable media of claim 19, wherein the executable instructions, when executed by the one or more processors, cause the system to:
- receive, in the request to create the predictive alert, an indication of how frequently monitoring the one or more variables of the web analytics data for the website should occur,
- wherein monitoring the one or more variables of the web analytics data for the website is performed according to the indication of how frequently the monitoring should occur.

* * * * *